Feb. 25, 1958  G. PLUNKETT ET AL  2,824,695
CONSTANT MULTIPLIER MECHANISM
Filed Jan. 26, 1954  13 Sheets-Sheet 9
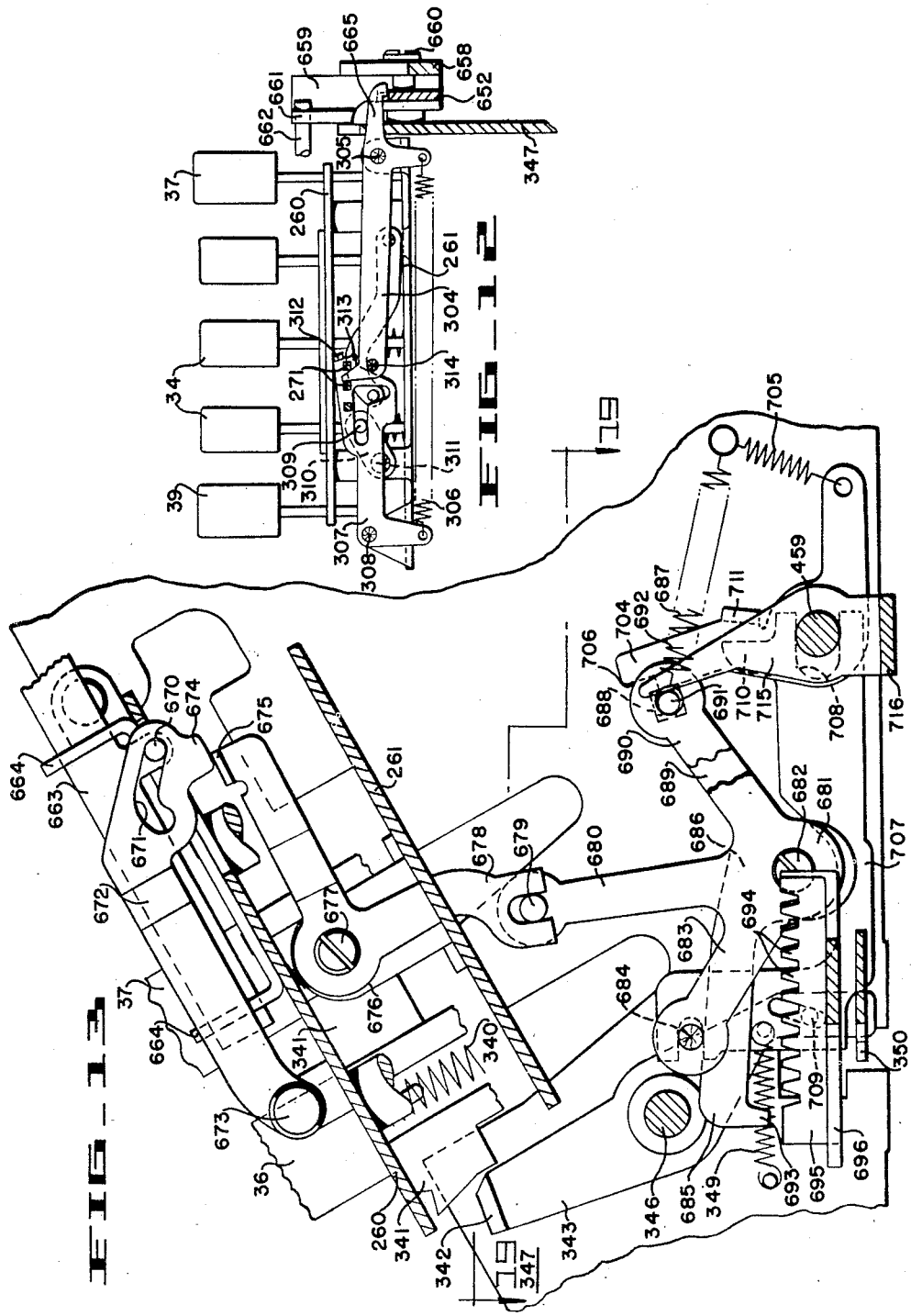

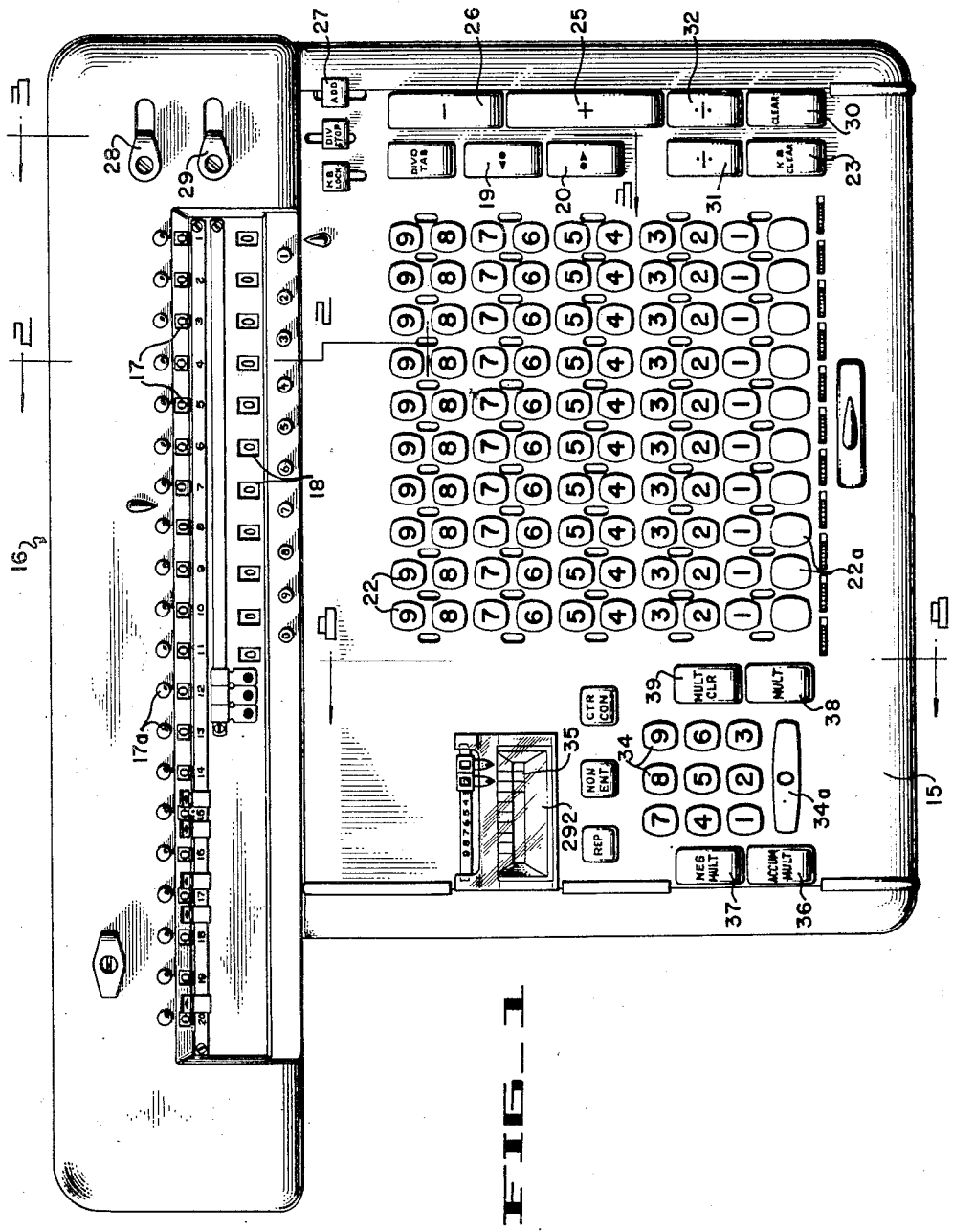

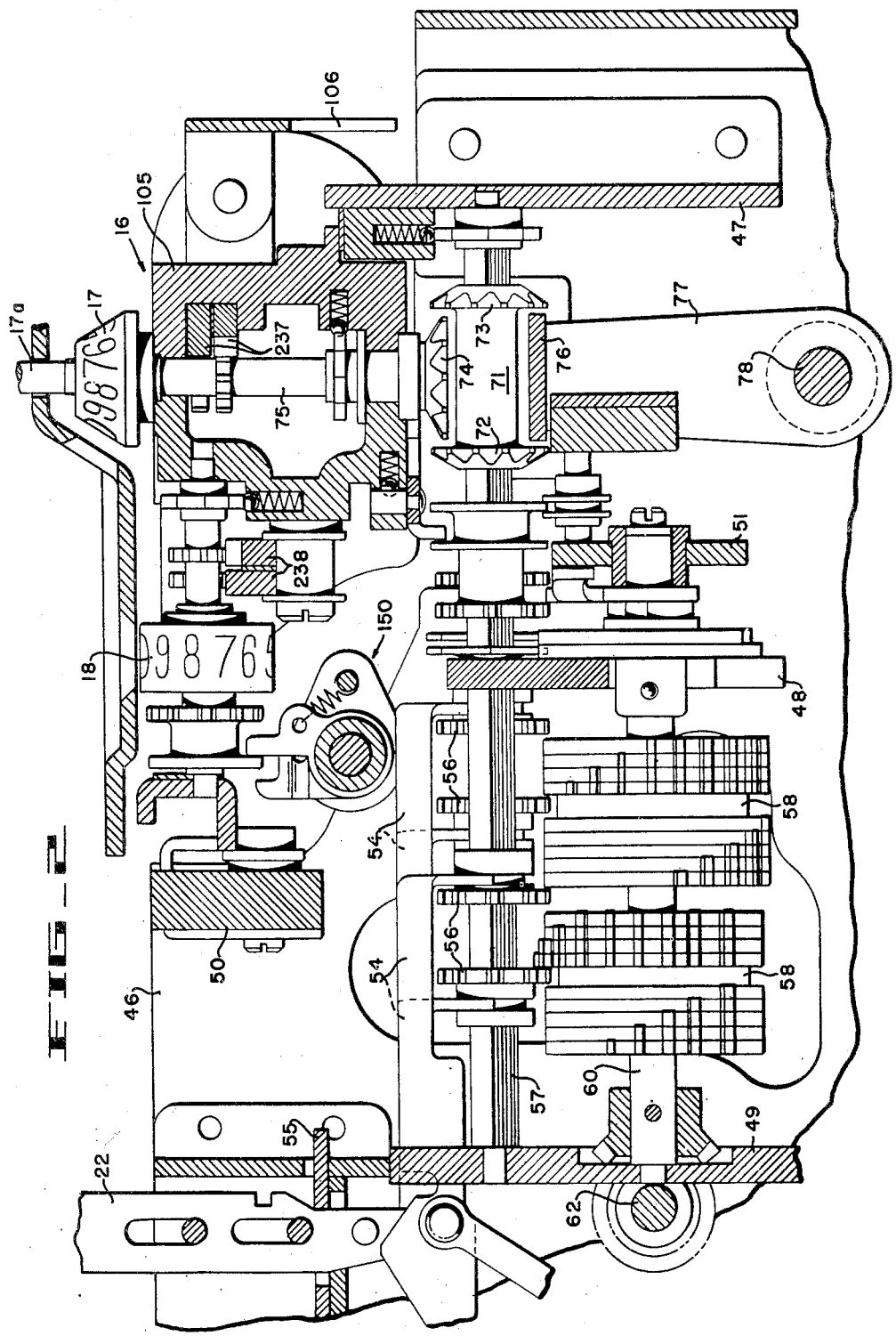

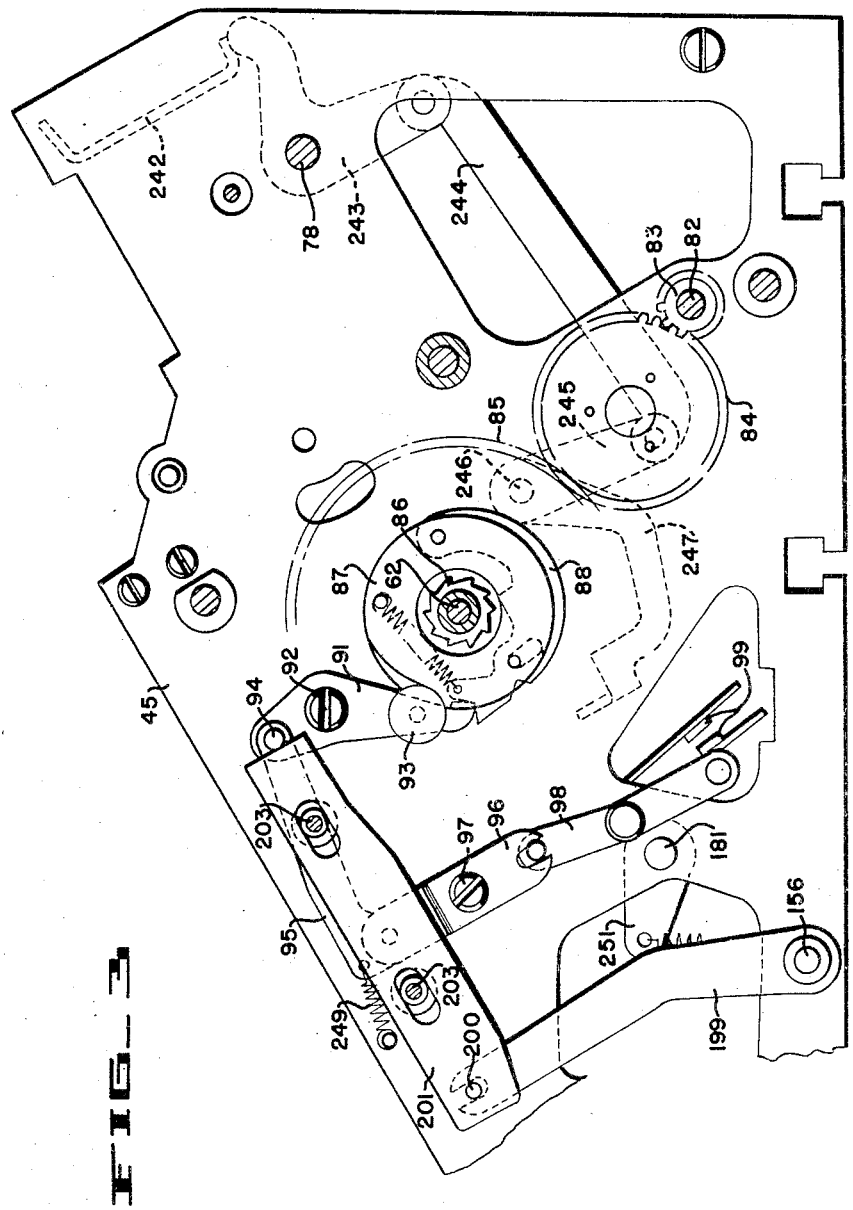

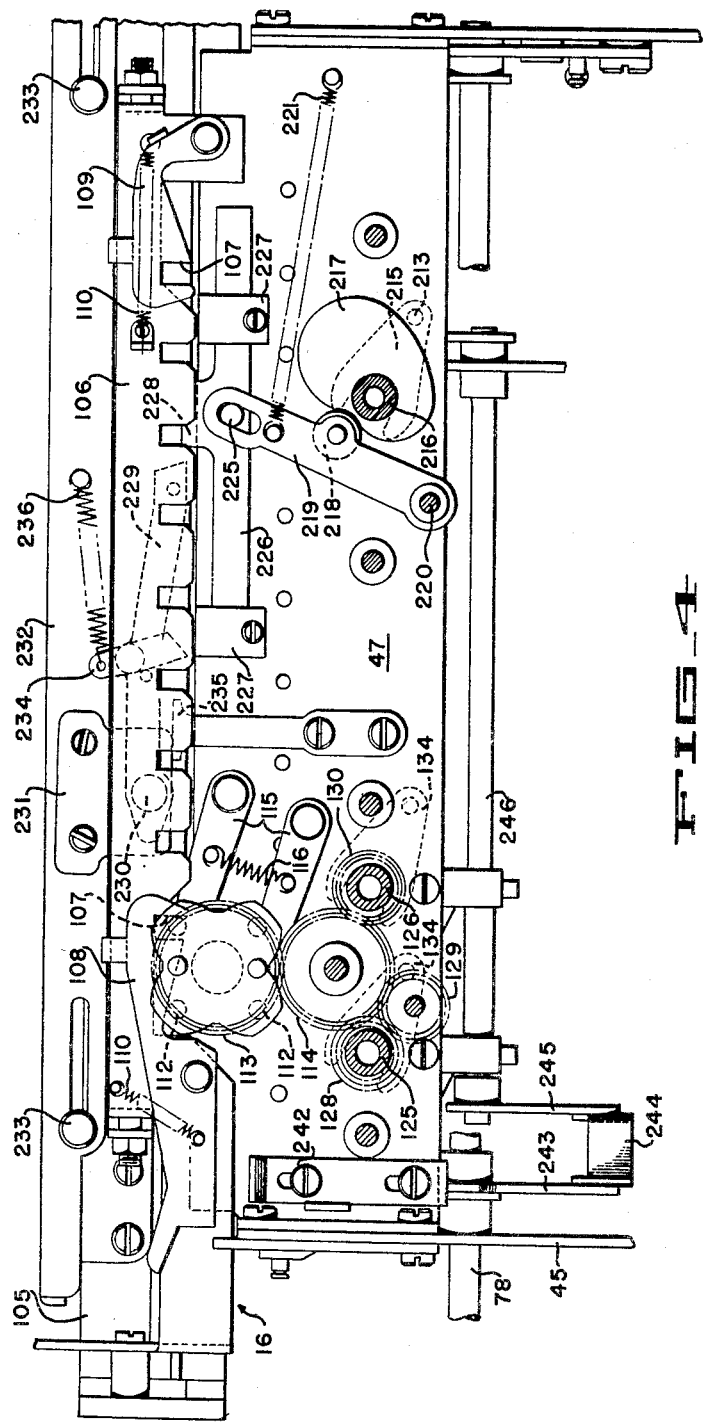

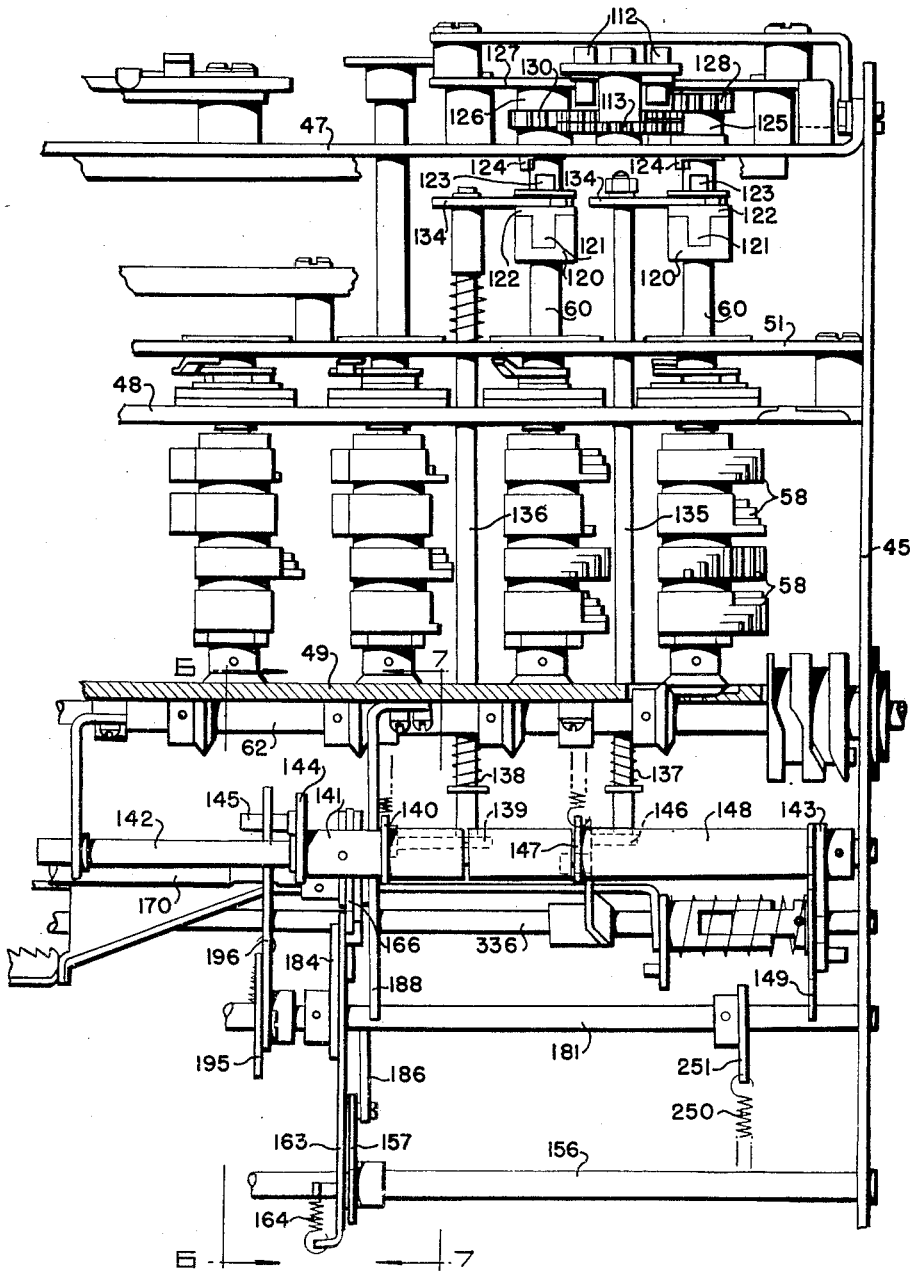
FIG_5

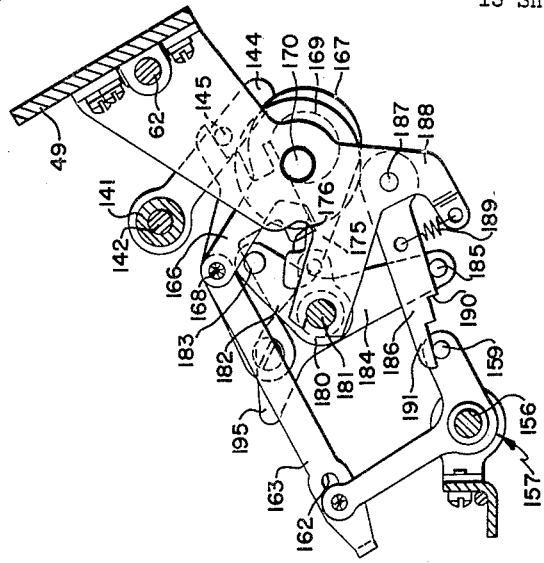
FIG_7
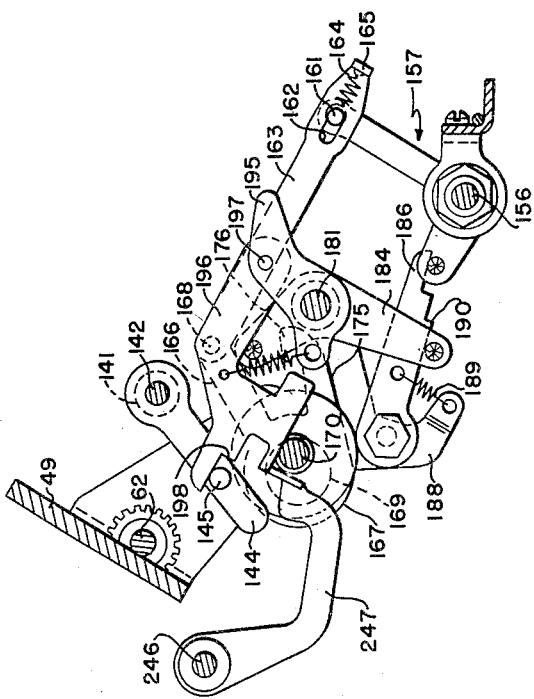
FIG_6

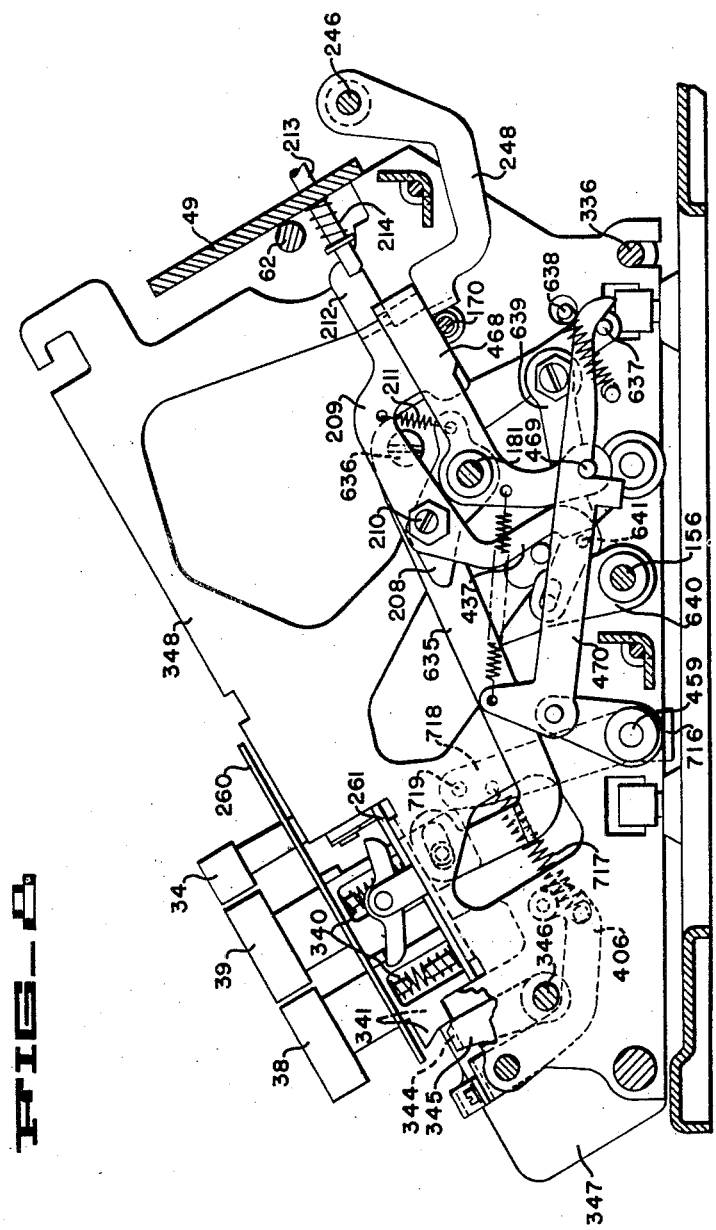

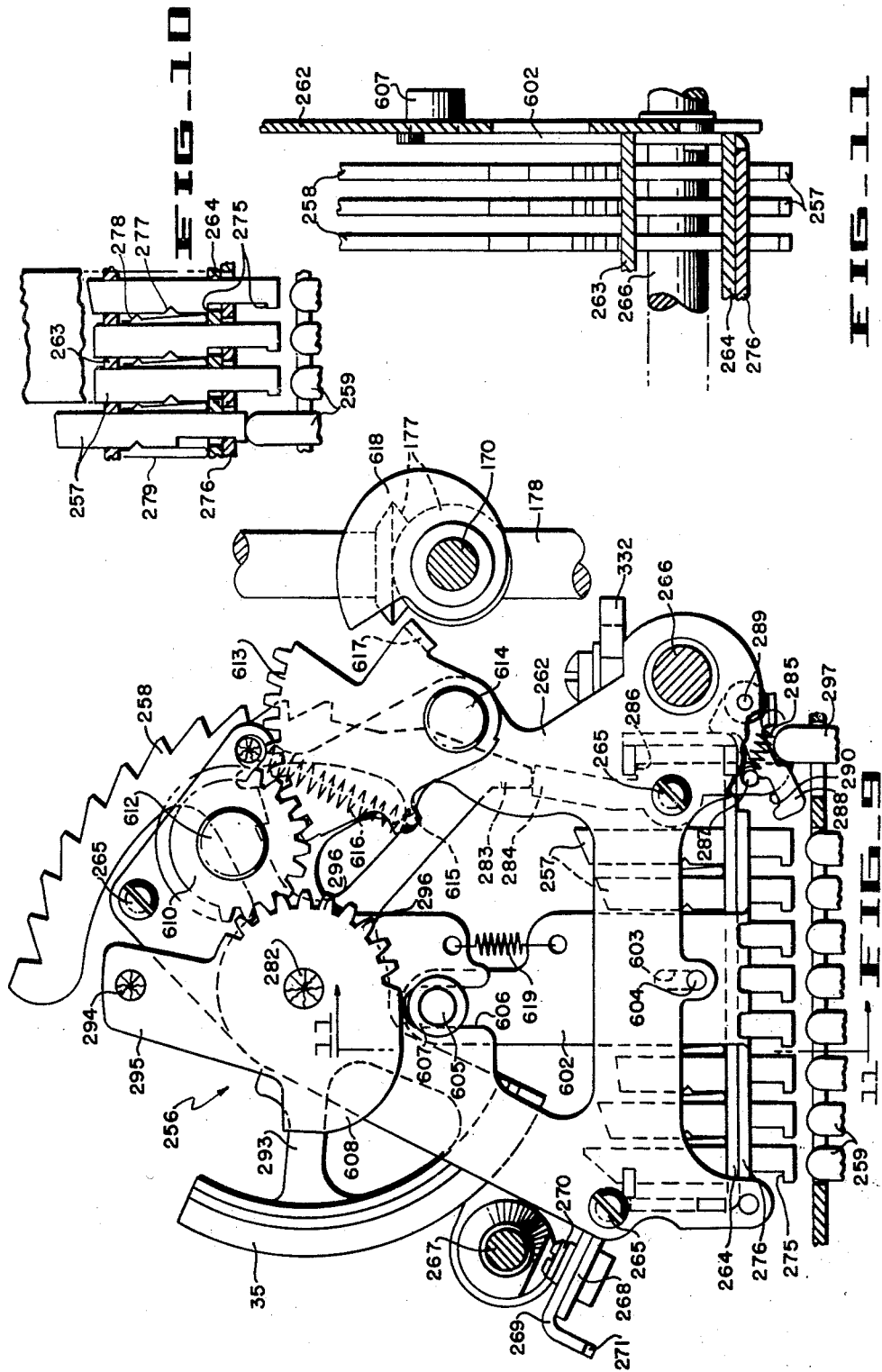

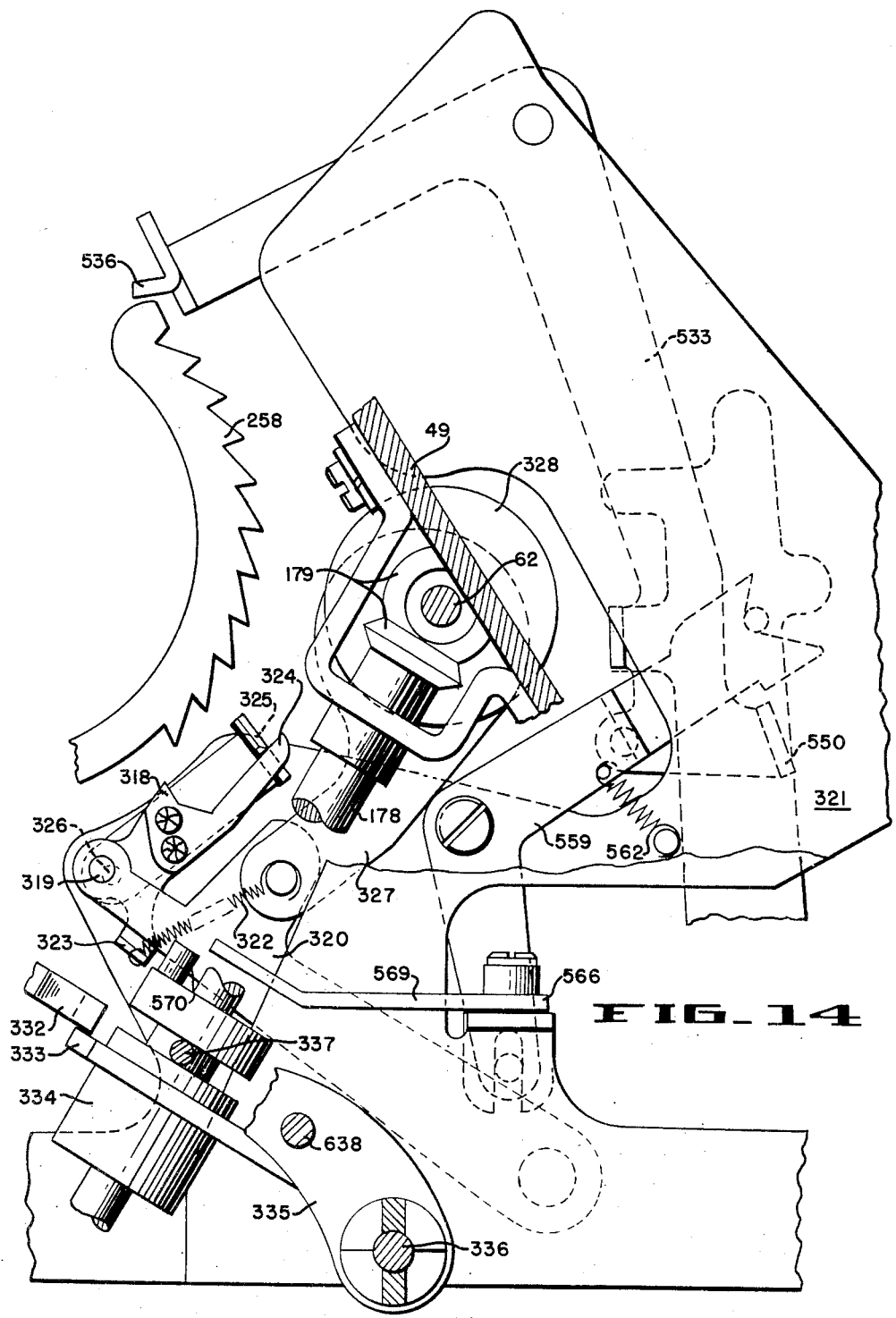

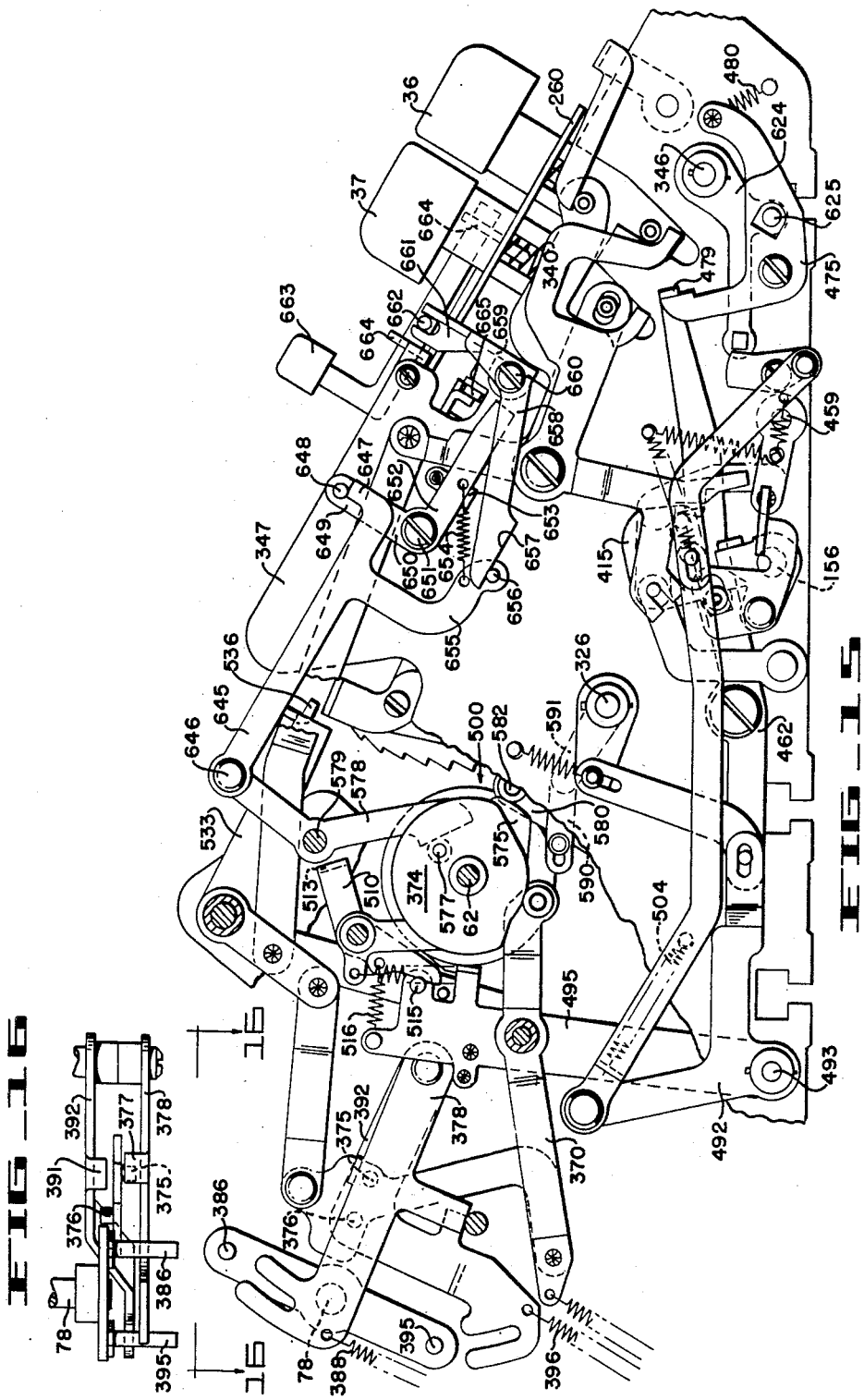

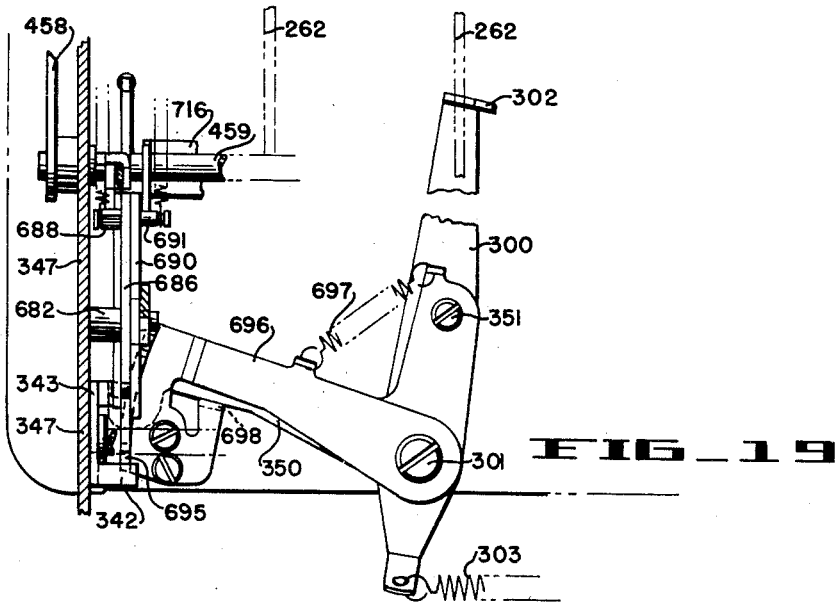
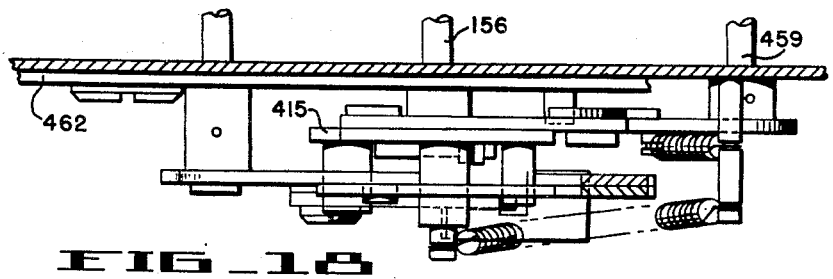
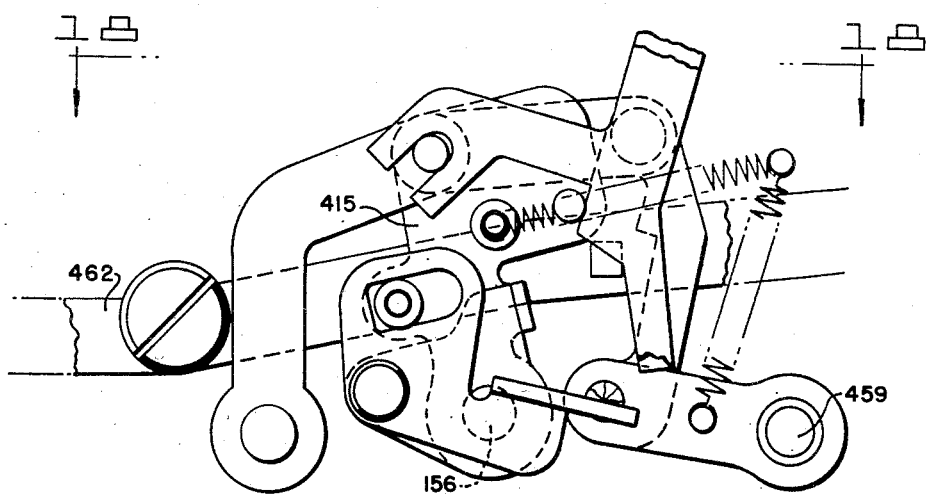

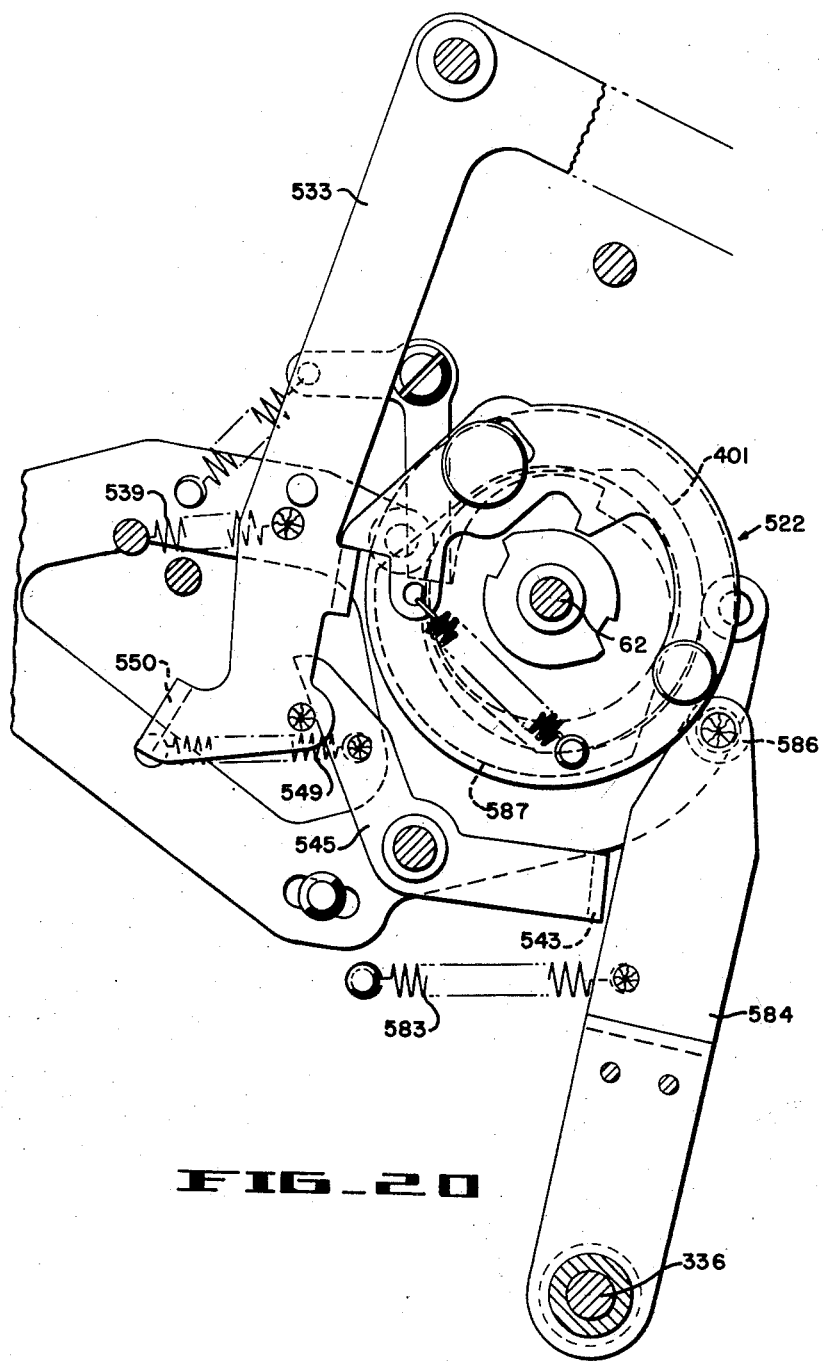
FIG_20

United States Patent Office 2,824,695
Patented Feb. 25, 1958

2,824,695

CONSTANT MULTIPLIER MECHANISM

Gilman Plunkett, San Leandro, and Nils H. Bergfelt, San Francisco, Calif., assignors to Friden Calculating Machine Co., Inc., a corporation of California Application January 26, 1954, Serial No. 406,228

9 Claims. (Cl. 235—63)

This invention relates to calculating machines and is concerned more particularly with the provision of an improved multiplying mechanism therefor.

It is an object of the invention to provide an improved multiplier mechanism in which a desired multiplier factor may be utilized automatically for a plurality of multiplication operations.

Another object of the invention is to provide an improved multiplier mechanism in which a desired multiplier factor may be automatically re-entered into the multiplier selection mechanism for a number of calculations.

Another object of the invention is to provide an improved multiplier mechanism in which a constant multiplier factor may be cleared from the selection mechanism upon termination of the last of a desired number of multiplying calculations.

Another object of the invention is to provide an improved multiplier mechanism for a calculating machine in which the selective control enabling a series of repeat multiplier operations may be disabled at any time during a multiplication operation.

A further object of the invention is to provide an improved multiplier mechanisms for a calculating machine in which a multiplier factor may be selectively cleared from, or restored to, the multiplier mechanism upon termination of a multiplication operation.

Another object of the invention is to provide an improved calculating machine in which the multiplier selection mechanism and the setting means therefor may be automatically and simultaneously restored to an ineffective position upon termination of a multiplying operation.

Other objects and advantages of the invention will be apparent from the following description of a preferred embodiment taken in connection with the accompanying drawings, in which:

Fig. 1 is a plan view of the calculating machine embodying the invention.

Fig. 2 is a longitudinal sectional elevation of the machine taken on line 2—2 of Fig. 1.

Fig. 3 is a sectional elevational view taken on line 3—3 of Fig. 1 with certain parts removed including the carriage to more clearly show the driving mechanism.

Fig. 4 is an elevational view of the upper rear portion of the machine.

Fig. 5 is a transverse sectional view of the machine taken on a plane parallel to and beneath the keyboard.

Fig. 6 is a fragmentary sectional view showing the power setting control taken on a vertical plane indicated by the line 6—6 of Fig. 5.

Fig. 7 is a fragmentary sectional view similar to Fig. 6 and taken on a vertical plane indicated by the line 7—7 of Fig. 5.

Fig. 8 is a right side elevational view partly in section of a portion of the multiplication control mechanism taken on a vertical plane indicated by the line 8—8 of Fig. 1.

Fig. 9 is an elevational view of the multiplier pin carriage showing the pin restore mechanism and multiplier zeroizing mechanism.

Fig. 10 is an enlarged sectional detail of the setting pins in the multiplier carriage.

Fig. 11 is a vertical fragmentary sectional view of the pin carriage taken on the plane indicated by the line 11—11 of Fig. 9.

Fig. 12 is a rear elevational view of the multiplier keyboard showing the escapement mechanism for the pin carriage.

Fig. 13 is a fragmentary sectional elevational view of the repeat multiplier control mechanism.

Fig. 14 is a sectional elevational view of a portion of the multiplier control mechanism.

Fig. 15 is an elevational view of the left side frame of the machine with a portion thereof broken away to more clearly show a portion of the multiplication mechanism.

Fig. 16 is a plan view showing the sign character control mechanism, the view being taken on a horizontal plane indicated by the line 16—16 of Fig. 15.

Fig. 17 is an enlarged detail of the interlock and multiplication initiating control on the left side frame of the machine.

Fig. 18 is a fragmentary plan view of the interlock and multiplication initiating control taken on the plane indicated by the line 18—18 of Fig. 17.

Fig. 19 is a plan view of the pin carriage left shift actuating mechanism and the repeat multiplier control mechanism, the view being taken on the horizontal plane indicated by line 19—19 of Fig. 13.

Fig. 20 is an enlarged sectional elevational view of the clutch control for the plus-minus gate and right shift mechanism.

The invention is illustrated in connection with the type of calculating machine having a unidirectionally operable actuator and reversible, or bidirectionally, operable numeral wheels. The invention is an improvement of the multiplying mechanism disclosed in the copending application of Gilman Plunkett, S. N. 401,780, filed January 4, 1954, and the patents to C. M. Friden No. 2,371,752 and to Friden et al. No. 2,399,917, each of which improvements are incorporated in the machine disclosed in the patent to Carl M. F. Friden No. 2,229,889. While certain features of our invention are adapted particularly for use in this type of machine, certain of such features and other features of the invention can be used in other types of calculating machines.

Referring to Fig. 1, the machine includes a body 15 in which the actuating, selecting, and control mechanisms are mounted and carriage 16 which is mounted for endwise shifting movement transversely of the body 15 and which carries numeral wheels 17 and 18 of the accumulator and revolutions counter, respectively. Numeral wheels 17 are provided with projecting twister handles 17a to provide for individual setting thereof. Carriage 16 can be shifted by power in either direction by manipulation of respective shift keys 19, 20 through conventional clutches described hereinafter.

Values are entered into the machine by depression of numeral keys 22 of the usual keyboard in the various ordinal rows thereof, keys 22 being releasable individually by depression of ordinal clear keys 22a or collectively by depression of keyboard clear key 23. Values introduced into the machine may be registered additively or subtractively on accumulator numeral wheels 17 by depression of plus key 25 or minus key 26, respectively. If desired, "add" key 27 may be moved forwardly to cause clearing of the keyboard in the usual manner after a single registration in the accumulator.

Values registered in numeral wheels 17 and 18 can be erased, i. e., the registers can be zeroized by manipulation of respective manually operable resetting handles 28, 29 or by power through depression of return and clear key 30. Depression of key 30 first effects return of carriage 16 to the farthest left position and subsequently effects resetting of both the accumulator 17 and the counter 18, either or neither, depending upon the setting of resetting handles 28, 29 which are adjustable to control such selective resetting.

The machine is adapted to perform automatic plural order division by means of conventional construction including division starting control keys 31, 32. Automatic predetermined multiplication can also be performed by depression of multiplier selection keys 34 to set up the desired multiplier figure as indicated on dials 35 and by depression of one of multiplication control keys 36, 37 or 38 to start the multiplying operation. If positive or negative accumulative multiplication is desired, the operation is begun by depression of accumulative multiply keys 36 or 37 which do not initiate an operation of the resetting mechanism. However, upon depression of key 38 the multiplying operation is begun with a shift of the carriage to the left followed by an operation of the resetting mechanism. If it is desired to correct an erroneously entered multiplier figure, multiplier correction key 39 may be depressed to zeroize the multiplier selection mechanism. The multiplying mechanism and the associated control means form the principal subject matter of the instant invention and are described later in detail.

With the above general organization of parts in mind, various of the above-noted mechanisms will be described in detail insofar as being necessary or desirable to an understanding of the present invention, it being understood that the mechanism which is not described fully may be of conventional construction such as that disclosed in the aforementioned patents to Friden Nos. 2,229,889 and 2,371,752, and Friden et al. No. 2,399,917, and the copending application of Gilman Plunkett.

*Selecting and actuating mechanism*

Within casing 15 the frame includes right and left side frames 45, 46 (Figs. 2 and 3) which are suitably mounted on the machine base and are interconnected by various crossframe members including transverse frames 47, 48, 49 and 50 for supporting various mechanisms including the selecting and actuating mechanism.

The values to be introduced into accumulator numeral wheels 17 are selected by means of a plurality of similar orders of selecting mechanism associated with numeral keys 22. For this purpose each bank, or order, of keys 22 (Fig. 2) cooperates with a pair of similar parallel spring-urged value-selecting slides 54 mounted for endwise movement by a suitable supporting linkage and extending through suitable slots in crossframe plate 49. Each slide 54 is provided with cam surfaces of varying inclination for cooperation with suitable pins on certain keys 22 to effect a differential movement of slide 54 on depression of a key 22. One slide 54 of each order cooperates with the "1" to "5" keys 22 of a bank, while the other slide 54 of the same order cooperates with the "6" to "9" keys 22 of the bank.

Each bank of keys 22 (Fig. 2) has a latching slide 55 of conventional construction associated therewith to latch any depressed key 22 releasably in depressed position against the tension of a spring associated therewith. To release depressed numeral keys 22, the latching slides 55 may be operated in any convenient manner by zero and clear keys 22a and 23 and by power as controlled by manipulation of "add" key 27.

Each selecting slide 54 (Fig. 2) is connected at its rear end with a 10-tooth gear 56 slidably and nonrotatably mounted on longitudinal square shaft 57, whereby movement of slide 54 serves to position the associated gear 56 on shaft 57 with respect to stepped teeth on the associated actuating cylinder 58 in accordance with the value of the depressed numeral key 22. A pair of actuating cylinders 58 for adjacent orders of the machine are mounted on each longitudinal actuating shaft 60 which is suitably journalled in crossframes 49 and 51 and has a suitable bevel gear connection with transverse driving shaft 62. Shaft 62 is operable cyclically in a single direction from clutch-control driving means, as described hereinafter, to provide the only path of power flow from the motor.

As seen in Fig. 2, the pair of square shafts 57 associated with each actuating shaft 60 are positioned above and to either side thereof, while the sets of gears 56 on respective square shafts 57 are offset longitudinally of the machine for cooperation with the similarly offset actuating cylinders 58. By the above arrangement and upon each rotation of the actuating means, a selected number of increments of movement can be imparted to each shaft 57 by the associated actuating cylinder 58 in accordance with the adjusted position of gears 56.

Each shaft 57 (Fig. 2) is suitably journalled in crossframe members 47, 48 and 49 and between plates 47 and 48 has associated therewith selectively settable plus-minus gears for driving an aligned numeral wheel 17. The plus-minus gears of each order of the machine include a spool 71 slidably and nonrotatably mounted on shaft 57, each spool having opposed 10-tooth bevel gears 72, 73 arranged for selective engagement with gear 74 on numeral wheel shaft 75. The engagement of gears 72 or 73 with gear 74 is controlled by strap 76 which extends transversely of the machine between each set of plus-minus gears 72, 73 and is mounted by similar spaced arms 77 on transverse shaft 78 which is suitably journalled in side frames 45 and 46. Shaft 78 is controlled in a manner hereinafter described to determine positive registration by meshing gears 72 with gears 74 and negative registration by meshing gears 73 with gears 74. In the neutral position shown in Fig. 2 in which gears 72 and 73 may be held normally by suitable spring-urged centralizing means associated with strap 76, carriage shifting can be effected.

During both additive and subtractive registration of values in numeral wheels 17, suitable transfer mechanism of conventional construction may be operative to effect the tens-transfer as disclosed, for example, in said Patent No. 2,229,889.

*Plus-minus keys*

As previously stated, the plus and minus keys 25 and 26 (Fig. 1) are adapted to control positive and negative registrations in the accumulator and for this purpose they may be connected by suitable mechanism, not disclosed herein, to effect rocking of shaft 78 (Fig. 2) whereby plus key 25 serves to mesh gears 72 with numeral wheel gears 74 and minus key 26 serves to mesh minus gears 73 with numeral wheel gears 74. The plus and minus keys also serve to engage the clutch and close the motor circuit by suitable means. This mechanism may be of the type disclosed in said Patent No. 2,229,889.

*Drive mechanism*

As stated above, the actuating means is operable cyclically to effect registration in the accumulator of the values set into the machine by depression of the numeral keys. For this purpose, a clutch-control drive is provided for the actuating mechanism which preferably forms the sole drive means for all power-driven parts of the machine. The source of power for the drive means comprises an electric motor provided with drive shaft 82 (Fig. 3) carrying drive gear 83 which is connected by idler gear 84 with gear 85 journalled on transverse shaft 62 and carrying driving clutch element or ratchet 86 on its hub. Driven clutch element 87 is secured on shaft 62 and has pivoted thereon spring-urged clutch pawl 88 having a tooth for engagement with the teeth of ratchet 86 to establish the drive connection. Pawl 88 is spring-urged to operative position but is restrained in the neutral, or full-cycle, position of the parts by clutch-control lever 91 pivoted at 92 on side frame 45. Lever 91 carries roller 93 which seats in a depression on clutch element 87 in the full-cycle position thereof and in other positions thereof maintains lever 91 in its clutch-engaging position for a purpose later referred to.

It is seen, therefore, that one or more cycles of operation of the actuating mechanism can be determined by oscillation of clutch-control lever 91.

Simultaneously with movement of control lever 91 the circuit for the motor is established and for this purpose pin 94 on the upper arm of clutch-control lever 91 is connected by link 95 with lever 96 pivoted at 97 on side frame 45 and connected at its lower end by a pin and slot engagement with lever 98 also pivoted on plate 45. Lever 98 has a suitable insulated pin in overlapping relation with a spring-mounted contact 99 normally spaced from a similar contact 99. Thus, clockwise movement of clutch-control lever 91 serves through link 95 and lever 96 to oscillate lever 98 in a counter-clockwise direction, whereby contacts 99 are engaged to establish the circuit for the motor. It will be noted that roller 93 in maintaining control lever 91 in clutch-engaging position, when the actuating means is out of full cycle position, also serves to maintain contacts 99 closed so that the motor circuit can be interrupted only in the full-cycle position of the parts.

*Carriage shift mechanism*

Means are provided for shifting the carriage in either direction from one ordinal position to another by power-driven means controlled by manually operable keys. The power-driven means preferably comprises elements of the actuating means for entering values into the accumulator register. Carriage 16 (Fig. 4) includes frame 105 having toothed shift rack 106 extending along the rear side thereof with its ends suitably supported on frame 105. The end slots 107 of the rack are formed in part by respective yieldable pawls 108 and 109 having respective springs 110 associated therewith. Slots 107 are adapted for engagement by shift pins 112 equiangularly disposed on shift gear 113 suitably journalled on a plate rigidly attached to cross plate 47. Shift gear 113 (Figs. 4 and 5) can be rotated selectively in either direction through idler gear 114 to shift the carriage through any desired number of ordinal spaces, each 90 degree rotation of gear 113 effecting one ordinal spacing of the carriage. Shift gear 113 is centralized by means of a cam and centralizing arms 115 having a suitable spring 116 connected therebetween.

In order to rotate shift gear 113 selectively in either direction, the two right-hand actuating shafts 60 (Fig. 5) are extended and are provided with similar controllable drive connections with gear 113. Each connection includes a collar 120 fixed on the associated shaft 60 adjacent the end thereof and having diametrically positioned slots slidably engaged by corresponding teeth 121 of shiftable collar 122, which is mounted for sliding movement at the end of shaft 60. Respective collars 122 are provided with a rearwardly extended arcuate portion 123 for operative engagement with corresponding teeth 124 of gear sleeves 125, 126. Gear sleeve 125 is suitably journalled in cross plate 47 and bracket 127 secured in spaced relation on plate 47 and carries gear 128 meshing with wide idler gear 129 (Fig. 4) which also meshes with idler gear 114. Similarly, gear sleeve 126 has gear 130 mounted thereon which meshes with idler gear 114 and has a similar controllable drive connection with an actuating shaft 60.

Thus, by selective shifting of collars 122 to establish a drive connection, rotation of one of actuating shafts 60 may be utilized to determine rotation of shift gear 113 in a selected direction to effect shifting of carriage 16 in either direction.

Similar mechanisms are provided to control shifting of collars 122. Each mechanism includes a fork 134 (Figs. 4 and 5) at the rear end of respective rods 135 and 136 and engaging a suitable annular groove in the associated collar 122. Each of the rods 135, 136 is suitably mounted on the frame for endwise movement and is spring-urged to the position shown in Fig. 5 by respective springs 137 and 138. Left shift rod 136 has associated therewith a pin 139 (Fig. 5) carried by arm 140 depending from sleeve 141 secured on shaft 142, which shaft also carries arm 143. Integral with arm 140, sleeve 141 carries depending arm 144 having a pin 145 for operative control of push rod 136, as will be described hereinafter. Shaft 142 and integral arms 140, 144 may be oscillated through arm 143 by shift key 19 to move the associated rod 136 rearwardly. Rod 135 is engaged by pin 146 carried on arm 147 depending from one end of sleeve 148 which carries arm 149 at its other end for operation by shift key 20. Keys 19 and 20 operate to cause oscillation of arms 143, 149 and engagement of the clutch and closing of the motor circuit in a conventional manner.

Thus, carriage 16 carrying numeral wheels 17, 18 can be shifted selectively in either direction through one or more ordinal positions by depression of keys 19 and 20 to control the cyclic operation of the actuating means.

*Revolutions counter*

Numeral wheels 18 (Figs. 1 and 2) of the revolutions counter, register the number of actuations of accumulator numeral wheels 17 in a conventional manner by the operation of counter actuator 150 as disclosed, for example, in said Patent No. 2,229,889.

*Return and resetting mechanism*

The return clear key 30 and the multiplication key 38 operate to cause a return clear operation, that is, a shift of the carriage to the left end position where the accumulator is cleared, or zeroized. The operation of the power-setting mechanism for lightening the key touch on each of these operation control keys will be described briefly in connection with the return clear key 30. Depression of the key 30 operates through mechanism not considered pertinent to the invention, and therefore not shown herein, to rock shaft 156 counter-clockwise as seen in Fig. 6 and clockwise in Fig. 7. Shaft 156 is similarly rocked upon depression of the multiplication keys 36, 37, and 38 by mechanism to be described hereinafter.

Shaft 156 carries bellcrank 157 provided with a stud 159 and a stud 161. The stud 161 is embraced in slot 162 of link 163, wherein spring 164 connects stud 161 to the formed-over ear 165 on the adjacent end of link 163. The other end of link 163 is pinned to arm 166 of hooked member 167 by pin 168. The hooked member 167 is rotatably mounted on eccentric 169 pinned to the shaft 170. The hooked member is provided with a second arm 175, the other end of which is provided with a hook 176.

The shaft 170 is connected at its one end by means of bevel gears 177 to shaft 178 (Figs. 9 and 14) which, in turn, is connected by bevel gears 179 to main drive shaft 62. By this means the shaft 170 is rotated in synchronism with the main drive shaft. It is thus obvious that the hooked member 167 continuously rocks on its eccentric mounting in synchronism with the main drive shaft whenever the main clutch 87 is engaged and the motor contacts are closed.

Bellcrank 180 is pinned to shaft 181 in a plane immediately adjacent to that of the hook 176. The upper arm 182 of the bellcrank is provided with stud 183 which, when the hooked member 167 is rocked clockwise (Fig. 7) with the rocking of the shaft 156, will be engaged by the hook 176 during its continuous reciprocation. However, when shaft 156 is in its inactive position, the counter-clockwise position shown in Fig. 7, reciprocating hook 176 cannot engage stud 183. When the hook 176 is rocked to its operative position, the leading edge thereof is moved into engagement with the stud 183 causing tensioning of the spring 164. Upon cycling of the machine, the initial 180 degrees rotation of shaft 170 serves to move hook 176 to a position above stud 183 when the tensioned spring 164 operates to move hook 176 into engagement therewith. The second 180 degree rotation of shaft 170 then becomes effective to rock bellcrank 180 clockwise as seen in Fig. 7. It will be understood that hook 176 is effective to pull bellcrank 180 and shaft 181 clockwise only after member 167 has been rocked clockwise on eccentric 169, otherwise the hook will not travel in a path which will bring it into engagement with stud 183.

The lower arm 184 of bellcrank 180 is provided with latching stud 185. Associated with the latching stud 185 is latching member 186 pivotally mounted at 187 on supporting bracket member 188. Latch 186 is urged counter-clockwise (Fig. 7) by spring 189 tensioned between the latch and the bracket 188. Shoulder 190 of latch 186 is adapted to engage pin 185 thereby latching bellcrank 180 and shaft 181 in the operative position thereof. Latch member 186 is also provided with extension 191 which is engaged by pin 159 on bellcrank 157 when the bellcrank and its shaft 156 are rocked in a counter-clockwise direction as viewed in Fig. 7, thereby releasing latch 186 and enabling a counter-clockwise rotation of shaft 181 under the influence of spring 250 through arm 251 on shaft 181 (Figs. 3 and 5). When adjusted to its operative position, rocking of the eccentrically mounted hooked member 167 is effective to pull bellcrank 180 to its extreme latched position and is thereafter disengaged therefrom during substantially the entire part of each cycle of operation.

Upon depression of the return and clear key 30, clockwise rocking of shaft 156 (Figs. 3 and 7) serves to engage the clutch and close the motor contacts. For this purpose shaft 156 carries upstanding arm 199, the free end of which is bifurcated to engage stud 200 on slide member 201 which is mounted for reciprocatory movement by similar slots therein embracing studs 203 in the framework of the machine. At its rearward end slide 201 abuts pin 94 of clutch control lever 91 so that clockwise rotation of shaft 156 moves member 201 rearward to engage the clutch and through link 95, levers 96 and 98, closes the motor contacts 99.

With the counter-clockwise rocking of shaft 156 upon depression of key 30, the subsequent rocking of the shaft 181 (Fig. 6) causes engagement of the left shift clutch and the clear clutch, as will now be explained. Referring to Figs. 5 and 6, the shaft 181 has arm 195 secured thereto on which pusher arm 196 is pivoted by any suitable means such as pin 197. Pusher arm 196 has shoulder 198 lying in operative relation to pin 145 of arm 144 which, it will be recalled, is integral with arm 140. Thus, it can be seen that upon rocking of shaft 181, pusher arm 196 is effective to rock arm 144 clockwise in Fig. 6 or rearward of the machine, as seen in Fig. 5, to rock arm 140 and pin 139 thereby moving left shift rod 136 rearward to engage the left shift clutch.

Rocking of shaft 181 also serves to enable the drive connection from the actuating means to the resetting drive means mounted on the frame of the machine. For this purpose, shaft 181 (Fig. 8) carries arm 208 having pusher link 209 pivoted thereon at 210 and urged by spring 211 to engage its notched end 212 with push rod 213 slidably mounted in brackets 48 and 49, and normally positioned, as shown in Fig. 8, by a spring 214. At its rearward end, rod 213 (Fig. 4) carries fork 215 operatively engaged with a shiftable toothed collar similar to shift collars 122 of the shift mechanism, and similarly mounted on one of actuating shafts 60. Rearward movement of the push rod 213 and fork 215 operates in a conventional manner to move the shiftable collar into driving engagement with sleeve 216 suitably journalled in cross plate 47 and an auxiliary plate secured thereon (not shown). Sleeve 216 (Fig. 4) carries cam 217 which is engaged by roller 218 on arm 219 pivoted on bracket 47, as at 220, and urged to follow cam 217 by spring 221. The upper end of arm 219 (Fig. 4) is slotted to engage pin 225 on slide 226 mounted for endwise movement on bracket 47 by small brackets 227. When carriage 16 is in the right-most position thereof as illustrated in Fig. 4, ear 228 formed at right angles to slide 226 is in operative relation with arm 229 pivoted at 230 on bracket 231 depending from resetting drive slide 232. Slide 232 has an L-shaped cross-section and is mounted for endwise sliding movement on carriage 16 by spaced studs 233. Reciprocation of slide 232 may be utilized in a conventional manner to reset either or both of the registers. Arm 229 has "live" one-way acting pawl 234 pivoted thereon intermediate its ends to cooperate with fixed ledge 235 mounted on bracket 47 to lift arm 229 out of the path of ear 228 during movement of the carriage into its end position. Spring 236 urges arm 229 to the position shown against a suitable stop on the carriage frame. With the parts positioned as illustrated in Fig. 4, it is seen that upon movement of slide 226 to the left, ear 228 will engage the end of arm 229 to reciprocate resetting drive slide 232. The reciprocation of slide 232 is effected in the first cycle following the shifting of the carriage into the end position shown in Fig. 4. Slide 232 is operatively related to either or both of resetting rack bars 237 and 238 (Fig. 2) of the accumulator and counter, respectively, by the adjustment of settable operating handles 28 and 29 to adjust the connections therebetween.

Key 30 may be latched in depressed position during shifting of the carriage to its end position if displaced therefrom and the latch may be released in a well-known manner during the first cycle of operation of the actuating means, when in said end position, under control of override pawl 108 (Fig. 4). Override pawl 108 also serves to interrupt operation of the shift and resetting drive connections after the first cycle (resetting cycle) following the shifting operation. For this purpose, slide 242 (Figs. 3 and 4) overlies an arm of bellcrank 243 pivoted on shaft 78 journalled in frame plates 45 and 46 and pivotally connected to link 244 which is also pivotally connected to arm 245 depending from shaft 246 suitably mounted on the frame. Shaft 246 (Figs. 3, 6 and 8) carries arms 247 and 248 underlying pusher links 196 and 209, respectively. Thus, upon rocking movement of override pawl 108 during the resetting cycle, the above-described linkage operates through arms 247 and 248 to lift pusher links 196 and 209 which results in release of left shift push rod 136 and resetting push rod 213, respectively, causing disengagement of the left shift and resetting drive connections.

Upon release of the return clear key 30, spring 249 (Fig. 3) serves to disengage the clutch, open the motor contacts, and through slide 201 and arm 199, rocks the shaft 156 counterclockwise as seen in Figs. 3 and 7. Counter-clockwise rotation of shaft 156 causes release of latch 186 by reason of engagement of pin 159 on bellcrank 157 with the extension 191 of the latch, for as shaft 156 and its bellcrank 157 rock counter-clockwise, pin 159 lifts latch 186 from its engagement with pin 185 of bellcrank 180. Upon release of latch 186, bellcrank 180 and therefore shaft 181 are rocked counter-clockwise to an inoperative position (Fig. 7) under the influence of spring 250 attached to arm 251 (Figs. 3 and 5) which is secured on shaft 181.

*Multiplication mechanism*

The multiplication mechanism of this invention comprises means for performing predetermined plural order multiplying operations in which the respective multiplicand and multiplier figures are entered into the machine by respective keyboards. The respective keyboards with their associated mechanisms control the operation of the machine to perform a multiplication in accordance with the depression of the positive or negative multiplication keys to determine the sign character of the registration of the product in the accumulator. As is usual in this type of machine, the multiplicand keyboard comprises the conventional keyboard of the calculator which is used in other operations while the multiplier keyboard is preferably of the so-called "ten-key" type which may be operated to set up successively the various digits of the multiplier. For the purpose of the instant description the multiplier keyboard and selection mechanism which serves to set the multiplier figure into the machine will be briefly described, and thereafter the operation controlling mechanism by means of which the multiplicand is entered in the accumulator a number of times corresponding to the respective ordinal values of the multiplier. Only that part of the selection mechanism pertinent to the present invention will be described in full. For a more complete disclosure of the mechanism, reference is to be had to the aforementioned Patent No. 2,371,752.

Multiplier keyboard

The selection mechanism for the multiplier figure is of the type disclosed in said Patent No. 2,371,752. Generally such mechanism comprises a ten-key keyboard including keys 34 (Fig. 1) and a pin carriage 256 (Fig. 9) associated therewith having ten ordinal rows of settable stop pins 257 and ten ordinal differentially adjustable elements 258 in the form of racks in which digits of the multiplier may be set successively for subsequent control of the multiplying operation. In order to set up the multiplier digits each pin row includes eight pins corresponding to "1" to "8" keys and a fixed stop corresponding to the "9" key so that a depressed multiplier key operates through an associated selection lever 259 to set the corresponding pin of an aligned ordinal row to active, or raised, position. At the same time that a pin of the pin carriage is moved to active position the aligned rack is released to move into engagement with the pin and thereby be set differentially in accordance with the value of the depressed key. Subsequently, the depressed key operates an escapement mechanism to move the pin carriage one ordinal step to the left with respect to the keyboard selection mechanism. As seen most clearly in Figs. 8 and 12, each multiplier key 34 and "0" key 34a is slidably mounted in upper and lower keyboard plates 260 and 261. Upon depression, each key 34 and the "0" key 34a operate to control the multiplier escapement mechanism which is referred to hereinafter, while the keys "1" to "8" are arranged in a conventional manner for cooperation with a row of selection levers 259 for setting the pin carriage mechanism. There is no selection lever for cooperation with the "9" multiplier key 34 since the "9" setting of the differentially adjustable racks is effected by means of a fixed stop rather than a settable pin stop, as occurs with the "1" to "8" multiplier keys.

A selection lever 259 (Figs. 9 and 10) is provided for multiplier keys 34 from "1" to "8," respectively, so that upon depression of a key 34 the corresponding lever 259 will be rocked upwardly to project the nose thereof to active pin-setting position as seen at the extreme left in Fig. 10. In the pin carriage, eight pins are provided in each ordinal row for the keys "1" to "8" while a stop bar is provided corresponding to the "9" key. The only function of the depression of the "9" multiplier key is to operate the escapement mechanism and to release the aligned rack in the pin carriage.

Multiplier carriage

As explained above, the shiftable pin carriage which controls the multiplying operation carries the ordinal rows of settable pins by means of which the multiplier digits are set into the machine as well as the differentially settable racks which are adjusted in accordance with the setting of the active pins and consequently the value of the multiplier digits. The machine illustrated has ten orders of pin rows and racks to provide for entry of a corresponding number of multiplier digits. When adjusted, the racks serve to display the selected multiplier value and thereafter are returned successively in step-by-step fashion to their initial positions, and during such return, control the operation of the mechanism in accordance with the successive multiplier digits.

The pin carriage frame comprises spaced-apart similar side plates 262 (Fig. 9) and respective upper and lower pin-holding plates 263 and 264 extending between the lower ends of side plates 262, both plates having suitable end projections engaging corresponding slots in plates 262. The frame assembly is held together by a plurality of tie rods having screws 265 threaded into the reduced ends thereof. The pin carriage is slidably mounted in the machine on rods 266 and 267 (Fig. 9). The upper holding plate 263 has a forwardly extended portion 268 to which escapement rack bar 269 is secured by means of screws 270. Rack bar 269 is provided at its edge with teeth 271 (Figs. 9 and 12) for cooperation with a step-by-step escapement mechanism, as will be described.

Referring to Figs. 9 and 10, pin plates 263 and 264 of the pin carriage are provided with a series of rows of aligned slots to receive pins 257 for limited endwise sliding movement as determined by the shoulders 275 of a channel formed in the lower portion thereof. The upper shoulder 275 formed by the channel engages the top surface of the lower pin plate 264 in the lowered inactive position of a pin 257, while the lower shoulder 275 engages the lower surface of pin restore plate 276 to limit the upward movement of the pin 257 in the active position thereof. Pin restore plate 276 is provided with a similar series of rows of aligned slots corresponding with the slots in the pin plate 264 and is normally operatively positioned relative to plate 264 to restore all active pins 257 to their inactive position in a manner later described. The upper ends of the pins 257 are of varying length to allow free movement of the associated settable rack past pins which are in their lower inactive position.

In order to latch a pin 257 in raised position each pin is provided with latching notch 277 for cooperation with V-shaped end portion 278 of slotted U-shaped spring plate 279 which is compressed between adjacent pins 257 of a row and is held in place between side plates 262. Plate 279 is provided to cooperate with each transverse series of pins in the respective rows. The slots in the lower plate 264 are shorter in length than the width of the upper portion of the pins 257, while the lower end of the pins is sufficiently narrower to enable passage thereof through the slots. In assembling the pins 257 in pin plates 263 and 264, the lower ends of the pins 257 are placed through the lower plate 264 to a position where the upper shoulders 275 engage the top surface of the plate. The upper plate 263 is then pressed down over the ends of the pins until suitable slots therein engage with corresponding locating projections on the upturned ends of the lower plate 264. The slots in the restore plate 276 correspond in length to those slots of plate 264, thereby permitting the passage of the lower ends of the pins 257. The restore plate 276 is then moved rearward to lock the pins 257 in position for upward and downward sliding movement, as seen in Fig. 10. The pin box unit thus formed is then locked in position between the carriage side plates 262.

Referring to Fig. 9, an ordinal row of pins 257 is provided for each differentially settable rack segment 258 which is normally held in its "0" position and which can be released to assume a differential adjustment in accordance with the pin of the associated row which is moved to active position by depression of a selected multiplier key. For this purpose, rack segments 258 are pivotally mounted in a conventional manner on transverse shaft 282 journalled in the side plates 262 and are normally urged in a clockwise direction, as viewed in Fig. 9, under the urgency of associated springs, not shown. Each segment 258 is provided with a stop 283 which normally engages the upper end of an associated holding pawl 284. The series of pawls 284, one for each rack segment 258, are pivoted on one of the spacer shafts extending between plates 262 and have their ends projecting through aligned slots in upper and lower pin plates 263 and 264. Each pawl 284 is urged in a counter-clockwise direction, as viewed in Fig. 9, by a spring 285 to a position determined by the engagement of shoulder 286 thereon with the lower surface of the upper pin plate 263. Each spring 285 is connected at its one end to a stud 287 on the lower end of each associated holding pawl 284, and at its other end in ears formed at right angles to latch arms 288 which are pivotally mounted on a transverse shaft 289 supported at its ends in plates 262. Mounted adjacent holding pawls 284, each latch arm 288 is provided with a notch 290 in the free end thereof which, upon clockwise rocking of holding pawl 284, is urged by spring 285 into operative engagement with stud 287 of the associated holding pawl. Thus pawl 284 is held in its inoperative position for the duration of the multiplying operation.

Each adjustable element 258 is provided with an indicating sector, or dial, 35 (Figs. 1 and 9) having numerals from "0" to "9," one of which becomes visible through sight opening 292 in case 15 to display the value of a multiplier digit set into the machine in accordance with the adjusted position of the element. For the values "1" to "8" such adjusted position is controlled by the active pin 257, while for the "9" position the leading edge of the spoke 293 of the adjustable element is adapted, when released, to engage a transverse bar 294 supported at its ends in the free ends of similar arms 295. Each of arms 295 is an integral part of similar segmental gears 296 which are secured on opposite ends of transverse shaft 282 for rocking movement in carriage plates 262.

Conventional means is provided for releasing rack segments 258 of the active order of the pin carriage 256 simultaneously with the movement of a pin 257 to active position. Pawl 284, for releasing a rack segment 258, is moved to inactive position by means of an arm (not shown) the nose 297 (Fig. 9) of which is operatively related to the lower end of the aligned holding pawl 284. Upon depression of the "1" to "8" multiplier keys 34, the corresponding selection lever 259 becomes active to project a pin 257 into active position in accordance with the value of the key depressed and the nose 297 is simultaneously moved to the left to rock the aligned pawl 284 to its inactive position thereby releasing the associated rack segment 258. As is well-known, however, depression of the "0" key 34a serves only to escape the pin carriage one step to the left and nose 297 is inoperative to release a pawl 284, while a depression of the "9" key operates nose 297 to release the associated pawl 284 when the segment rotates to its "9" position determined by bar 294. Upon movement of pawl 284 to its inactive position, spring 285 becomes active to rock the notch 290 of the adjacent latch arm 288 into engagement with the stud 287 of the pawl. For a complete description of the pin-setting and pawl-releasing mechanism reference is to be had to the aforementioned Patent No. 2,371,752.

*Multiplier carriage escapement mechanism*

As previously explained, the pin carriage is movable step-by-step transversely of the machine in accordance with the number of multiplier digits entered. The pin carriage is normally in its right-end position, as viewed from the front of the machine, with indicating sectors 35 to the right of, and not visible through, sight opening 292. The condition shown in Fig. 1 would obtain, after three successive depressions of "0" key 34a or digit keys 34 to move the pin carriage to its left when three sectors 35 are in value displaying position. The pin carriage is spring-urged toward its left-end position in a well-known manner by means of horizontally disposed bellcrank 300 (Fig. 19) which is pivoted at 301 on the machine base by means of an adjustable eccentric and has an upstanding arm 302 engaging right side plate 262 of the pin carriage. Another arm of bellcrank 300 has spring 303 secured thereto whereby the bellcrank is urged in a counter-clockwise direction, as viewed in Fig. 19, and correspondingly the pin carriage is urged from its right-end position which it occupies when no multiplier value is set in the machine.

Normally, the movement of the pin carriage under the influence of spring-urged bellcrank 300 is prevented by means of stop pawl 304 (Fig. 12) pivoted at 305 on an upstanding ear of lower keyboard plate 261. Spring 306 tensioned between a depending arm of pawl 304 and pawl arm 307 pivoted at 308 on an upstanding ear of lower keyboard plate 261, serves to urge pawl 307 to its inactive position and the nose of pawl 304 to its active position in engagement with a tooth 271 of the carriage escapement rack 269, previously described. Pawl arm 307 is slotted longitudinally to receive pin 309 carried by arm 310 on rod 311 journalled in spaced ears of lower keyboard plate 261. Pawl arm 307 also carries laterally projecting tooth 312 which is normally positioned immediately above teeth 271, as shown in Fig. 12, and is disposed for downward movement between the pair of teeth adjacent and to the right of that contacted by stop pawl 304. A nose 313 is also carried by pawl arm 307 and overlies pin 314 of stop pawl 304 for control thereof.

Preferably, the escapement shift is performed in two stages; one stage occurring during depression of a multiplier key and the last stage occurring just before return of the key to raised position. When a multiplier key is depressed, shaft 311 is rocked in a manner disclosed in the aforementioned Patent No. 2,371,752 whereby arm 310 (Fig. 12) and pin 309 serve to rock pawl arm 307 about its pivot in a clockwise direction, thereby simultaneously lowering the tooth 312 of pawl arm 307 from the position shown in Fig. 12 to overlap the adjacent rack tooth 271. During continued movement of pawl 307 its nose 313 engages pin 314 and rocks stop pawl 304 to disengage its nose from the associated tooth 271. As soon as the nose of the pawl 304 is disengaged from a tooth 271, the first stage of the shift step occurs and the pin carriage moves to the right, as viewed in Fig. 12, under the influence of the spring pressure thereon until a rack tooth 271 engages tooth 312 of arm 307.

The movement of the pin carriage during this stage of a shift step corresponds to the space between the tooth 312 and the rack tooth 271 adjacent thereto. This movement serves to move the active tooth 271 over the nose of pawl 304 but is insufficient to allow engagement of the projected selection lever 259 (Figs. 9 and 10) with the next pin row. Subsequently, as the depressed multiplier key is released the parts start their return from depressed position. Pawl 304, however, is held depressed by the associated tooth 271 and cannot return upwardly with the other parts until the inclined face of tooth 312 has permitted shifting of the pin carriage sufficiently to move the associated tooth 271 from over the nose of pawl 304 so that the pawl 304 will work upwardly into engagement with the next tooth 271 to the left of the tooth with which it was engaged before depression of the multiplier key. Shortly before the depressed key is restored to its upper position, the one step shift is completed whereby all of the pin setting and escapement shift parts will also be restored to normal position and the carriage will be conditioned for a subsequent shifting movement.

From the foregoing description it will be seen that each time a multiplier key is depressed, the aligned rack segment and selected pin of the pin carriage are set, while at the same time the carriage has escaped one step toward the left of the machine to display the set figure through the multiplier sight opening. This operation is repeated as the various digits of the multiplier are set into the machine. If a mistake is made in setting the multiplier digit such mistake can be corrected by resetting the multiplier racks, as will be described hereinafter.

The operating mechanism for the racks 258 is conventional and comprises feed pawl 318 (Fig. 14) which, with the pin carriage in its right-hand position, as viewed from the front of the machine, is located one ordinal step to the left thereof. As each rack is adjusted by depression of a multiplier key 34 or "0" key 34a, and the pin carriage escapes one step to the left, the adjusted rack moves into alignment with the actuating pawl 318. Thus, after the complete multiplier is set into the machine, the last adjusted rack 258 corresponding to the lowest digit of the multiplier will always be aligned with pawl 318 at the end of the multiplier setting operation.

Pawl 318 (Fig. 14) is pivotally secured at 319 to the end of arm 320 suitably pivoted on frame plate 321. Pawl 318 is urged in a counter-clockwise direction, as viewed in Fig. 14, by spring 322 tensioned between a pin on arm 320 and a lug 323 of pawl 318. Lug 323 is spaced from arm 320 in the inactive position of pawl 318 and engages arm 320 to limit the rocking movement of the pawl upon movement to active position. Pawl 318 is held in inactive position by its upward extension 324 engaging behind holding pawl 325 which is secured at the end of shaft 326 suitably journalled in the framework of the machine. Pawl 318 is held in the position shown in Fig. 14 until depression of a multiplication operation key so that both feed pawl 318 and holding pawl 325 are maintained inactive until the multiplying operation is begun.

In order to actuate pawl 318, arm 320 is pivotally connected to pitman 327 which engages an eccentric cam (not shown) secured on shaft 62 between similar disks 328 as disclosed in said patents. Pitman 327, arm 320, and pawl 318 are reciprocated once for each cycle or rotation of shaft 62. The operation of the pawl 318 in its active direction occurs at the beginning of each cycle. However, the pawl 318 is held in inactive position until holding pawl 325 is allowed to move in a counter-clockwise direction from the position shown in Fig. 14 by oscillation of shaft 326. Each rack 258 is restored step-by-step, upon operation of pawl 318, to its inactive or "0" position and operates in the last step of movement to provide for the shift cycle at the end of each ordinal multiplication.

It will be recalled that in setting up the multiplier value, each holding pawl 234 (Fig. 9) is rocked clockwise to release the associated rack segment 258 and is maintained in this rocked position by the engagement of the latch arm 288 with the stud 287. The last step movement of the active rack to its normal position controls and determines shifting of the accumulator and the pin carriage to align the next higher order rack 258 with the pawl 318, as described in said patents. To enable an ordinal right shift of the pin carriage, feed pawl 318 is restored to its inoperative position following the last step movement of the active rack segment 258 whereupon the segment is released to the adjusted position initially determined by the associated active pin 257 or transverse bar 294.

*Pin carriage shifting means*

As seen in Figs. 9 and 14, the pin carriage is provided with a shift rack 332 secured on the framework of the carriage. Rack 332 is adapted for operation by an operating pawl 333 carried by an eccentric portion of collar 334 which is slidably and non-rotatably mounted on shaft 178 for cyclic control thereof. Arm 335 is mounted for rocking movement on shaft 336 and carries pin 337 engaging in an annular groove of collar 334 normally positioning pawl 333 below rack 332, as seen in Fig. 14. Operation of arm 335 through a jaw clutch on shaft 336 serves to lift the pawl 333 into the plane of rack 332 to effect a one-step shift of the pin carriage during a multiplying operation. The direction of the shift is toward the right, as viewed from the front of the machine. The shifting of the pin carriage is controlled in the course of a multiplying operation, as described in said copending application.

*Multiplication control mechanism*

Multiplication keys 36, 37 and 38 (Figs. 1, 8, 13 and 15) are mounted for endwise sliding movement in respective keyboard plates 260 and 261, and are urged to raised position by similar springs 340 disposed in the slotted key pins and compressed between the key and lower plate 261. The raised position of the respective keys is determined by the respective latch arms 341 engaging the under surface of upper plate 260. At their outer end latch arms 341 of keys 36 and 37 are provided with latching teeth for engagement with a single latching tooth 342 on latch lever 343 (Fig. 13) while the latch arms 341 of keys 38 and 39 have respective latching teeth for engagement with a single latching tooth 344 on latch lever 345 (Fig. 8). Each of latch levers 343 and 345 are secured on transverse shaft 346 which is suitably journalled in vertical frame plates 347 and 348 of the multiplier unit. Latch levers 343 and 345 are urged in a clockwise direction by spring 349 suitably tensioned between the frame and the lower end of lever 343. The lower end of lever 343 is also operatively related with arm 350 which is adjustably secured by any means such as screw 351 (Fig. 19) to form bellcrank 300, whereby the latch for the depressed keys 36, 37, 38 or 39 can be released at the end of an operation, as will be later described. Suitable interlocking means may be provided for preventing simultaneous depression of keys 36 and 37, or 38 and 39.

The multiplication control keys 36, 37, or 38 (Fig. 1) and the mechanism controlled thereby are of the character disclosed in said copending application and so will not be described in detail. It is sufficient for the purposes of the present invention to understand that depression of any key 36, 37 or 38 operates arm 415 (Figs. 15 and 17) to rock shaft 156 (Figs. 6 and 7) thereby initiating a left shift of the accumulator to an end position or a left shift and resetting operation in accordance with the key depressed. In the left end position of the accumulator, the overstroke cycle of the left shift mechanism is effective through override pawl 108 to rock shaft 246 and arms 247 and 248 (Figs. 3, 4, 6, and 8) to disable the left shift and resetting mechanism. Upon rocking of shaft 246, arm 248 serves through bellcrank 468 and link 470 to rock shaft 459 to initiate operation of the multiplying mechanism.

Referring to Fig. 15, shaft 459 controls clockwise movement of lever 462 which effects a clockwise rocking of shaft 326 to enable the step-by-step return of the adjusted racks 258 in sequence from the lowest through the highest order thereof, with a one-step shift of the accumulator and of the pin carriage occurring between each ordinal multiplication. Lever 462 also imparts a counter-clockwise rotation to bellcrank 492, shaft 493, and therefore arm 495 to effect engagement of clutch 500. Latching bellcrank 475 engages ear 479 of control lever 462 to maintain arm 495 in its clutch-engaging position until pin carriage 256 has been restored to its inoperative, or "home," position, as will be described hereinafter. Rocking of arm 495 operates through spring 539 (Fig. 20) to impart a clockwise rotation to lever 533 thereby effecting a subsequent engagement of clutch 522.

Upon engagement of clutch 500, spring 516 (Fig. 15) becomes effective to move ear 513 of bellcrank 510 against the peripheral surface of the driven disk of clutch 500. Clutch 500 is permitted an initial rotation of 270 degrees in the first multiplication cycle when it is immediately disengaged by ear 513 for the duration of the multiplying operation. During the initial rotation of the clutch, the high point of cam 575 driven thereby is moved out of engagement with roller 582 of arm 580 secured on shaft 336 to enable the sequential control by clutch 522 of the ordinal right shift mechanism for the pin carriage. The cam 374 spaced apart from cam 575 by roller 577 and driven by clutch 500 oscillates lever 370 to engage either positive or negative setting arms 378 or 392 with their respective pins 386 or 395 in accordance with the position of pins 375 and 376 relative to the respective ears 377, 391 (Fig. 16).

As lever 533 is rocked clockwise, spring 549 serves to move ear 543 of bellcrank 545 into engagement with the driven disk of clutch 522, which ear 543 is effective to disengage the clutch after 90 degrees of rotation. Immediately following the engagement of clutch 522 and in the first 90 degrees of rotation, cam 587 driven thereby engages roller 586 of arm 584, which is integral with arm 580, to maintain the right shift mechanism inoperative. Subsequent to the operation of clutch 500 and cam 374, clutch 522 and cam 401 moves the actively positioned setting arm 378 or 392 to the left (Fig. 15) to engage the plus-minus gears.

As explained, the feed pawl 318 returns the active rack 258 step-by-step and during the last step of movement the rack engages ear 536 to oscillate lever 533 counter-clockwise as viewed in Fig. 20 or clockwise in Fig. 14 when ear 543 is rocked to effect re-engagement of clutch 522. Immediately following the clockwise rocking of lever 533 (Fig. 14) spring 562 serves to rock lever 559 into latching engagement with ear 550 of lever 533 and rocks the arm 569 of bellcrank 566 counter-clockwise as viewed from the top, so that the nose thereof is in the rotational plane of pin 570 when collar 334 is moved upwardly to its operative position. Upon re-engagement of clutch 522 for rotation to its full-cycle position, cam 587 is effective to enable the movement of arms 580, 584 and therefore shaft 336 to an operative right shift control position under the urgency of spring 583 (Fig. 20). Likewise, cam 401 moves the plus-minus gears to their centralized position with respect to the accumulator shaft gears. With the counter-clockwise rocking of arms 580, 584 (Fig. 15) link 590 and arm 591 operate to rock shaft 326 counter-clockwise thereby disabling feed pawl 318 for the shift cycle.

Thus it can be seen, that upon the last step movement of the active rack 258 and disabling of the feed pawl 318 the rack is immediately returned to its original position representative of the digit set therein. In the ensuing shift cycle, the pin carriage is shifted one ordinal position to the right, as viewed from the front of the machine, while lever 533 (Fig. 14) is maintained in its clockwise position by the latch 559. However, near the end of the shift cycle, pin 570 on shift collar 334 rocks lever 566 to release latch 559, whereupon tensioned spring 539 (Fig. 20) urges lever 533 clockwise to again effect engagement of clutch 522.

The foregoing sequence of operations continues until the pin carriage has been returned to its "home" position when the multiplying operation is terminated. It is believed that the description of the multiplying mechanism is sufficient for an understanding of the invention, however, for a complete disclosure thereof, reference is to be had to the said copending application of Gilman Plunkett.

*Pin restoring means*

Upon return of the pin carriage 256 to its right-hand, or normally inoperative, position, means are brought into play to restore each of the pins 257 (Figs. 9, 10 and 11) which have been previously set and also to release any multiplication control key which has been depressed, thereby effecting a clockwise rocking of arm 495 (Fig. 15) to its inactive position. When the last or highest order rack 258 has been restored to "0," the shift control is again operated to move the pin carriage one ordinal position to the right of feed pawl 318. An idle shifting movement of the pin carriage is thereafter effected, however, escapement stop pawl 304 (Fig. 12) is ineffective to retain the carriage in this position and spring 303 (Fig. 19) serves to return the pin carriage one step to the left, i. e., to its last shifted position or one ordinal position to the right of feed pawl 318 where it is held by the engagement of stop pawl 304.

Referring now to Figs. 9, 10 and 11, during the idle shifting movement of the pin carriage 256, means are provided for restoring to an inactive position any or all pins 257 which have previously been set. As previously described, pin-restoring plate 276 is so constructed and assembled that the lower surface thereof engages lower shoulder 275 of any pin or pins which have been moved to active position. Restore plate 276 is provided on either side thereof with similar upright arms 602 which form a U-shaped member mounted for reciprocatory movement within the framework of the pin carriage 256. To maintain plate 276 in a parallel plane relative to holding plate 264 during such movement, each arm 602 is provided with a vertical longitudinal slot 603 engaging a pin 604 on the respective carriage frame plates 262. At its upper end, each arm 602 is provided with a stud 605 slidably engaged in an open end slot 606 of the frame plates 262 and having a roller 607 disposed thereon for engagement by similar cam portions 608 of segmental gears 296 secured on either end of shaft 282. One of the gear segments 296 is meshed with a single idler gear 610 rotatably mounted on a stud 612 on right-hand frame plate 262 of the pin carriage 256, which idler gear 610 is also in mesh with a gear sector 613 rotatably mounted on a stud 614 of the frame plate 262. Rocking movement of sector 613 therefore serves to impart rotation to shaft 282 and therefore each segment 296 and cams 608. Gear sector 613 carries an ear 615 formed at right angles thereto and normally maintained in engagement with a protrusion of frame plate 262 under the urgency of a spring 616. During the idle shifting movement of pin carriage 256, an ear 617 of gear sector 613 is moved into the rotational plane of a cam 618 secured on shaft 179 continuously driven by bevel gears 177, as described hereinbefore. After a 180 degree clockwise rotation of cam 618 during the last idle shift cycle, cam 618 engages ear 617 to rock gear sector 613, gear segments 296 and therefore shaft 282 counter-clockwise, as viewed in Fig. 9. Cams 608 of segments 296 then serve through rollers 607 to move pin-restoring plate 276 downwardly against the urgency of similar springs 619 thereby restoring all actively set pins to their inactive positions.

It will be recalled that upon the setting up of each digit of a multiplier value into the pin carriage, nose 297 (Fig. 9) of a conventional selection mechanism is moved to the left in a well-known manner to release holding pawl 284, thereby permitting rotation of the associated multiplier rack segment 258 until its stop end 283 engages a selectively set pin 257 under the urgency of a spring, not shown. Each pawl 284, upon release thereof, is maintained in its rocked position by the engagement of notch 290 of the associated latch arm 288 with stud 287 on the lower end of the pawl. In the latching position of each arm 288, the nose thereof engages the lower surface of restore plate 276. It becomes obvious, therefore, that during the shifting movement of the pin carriage following the restoration of the previously active rack to its "0" position, the rack is immediately released to its originally set position as determined by the set pin associated therewith. Consequently, as the pin carriage is moved into its rightmost position during the idle shifting movement thereof, the multiplier value, as originally set up, is again standing in the pin carriage, but is not visible through sight opening 292 (Fig. 1). However, in this rightmost position when the cam 618 rocks shaft 282 counter-clockwise, as viewed in Fig. 9, transverse bar 294 supported between similar arms 295 of gear segments 296 serves to restore all set segments 258 to their "0" position. Substantially simultaneously, gear segment 296 also serves to move restore plate 276 downwardly thereby returning the set pins 257 to their inactive position and disengaging the latch arms 288, rocking them counter-clockwise against the urgency of springs 285 to release holding pawls 284 for engagement with the stop ends 283 of the segments 258, under the urgency of the tensioned springs 285.

Multiplication control key release

A selectively set control key 36, 37, or 38 may be released from its depressed position in a conventional manner. That is, near the end of the idle shifting movement of the pin carriage 256, bellcrank 300 and therefore arm 350 (Figs. 13 and 19) is rocked clockwise to disable latch arm 343 and latch arm 345 when the depressed control key is free to rise. Rocking of the shaft 346 (Figs. 13 and 15) to which latch levers 343 and 345 are secured, also serves to release latching bellcrank 475 to permit the return of control lever 462, bellcrank 492, and arm 495 to their inoperative position under the urgency of spring 504. Similarly, spring 504 serves through bellcrank 492 to rock shaft 326 counterclockwise thereby disabling feed pawl 318. To release the latching bellcrank 475, arm 624 secured to one end of latch lever shaft 346 carries pin 625 engaging in an aperture in the horizontally disposed arm of latch bellcrank 475 for control thereof. Upon engagement of latch 475 with ear 479 of lever 462, the inner edge of the aperture in bellcrank 475 engages pin 625 of arm 624. Hence, when shaft 346 is rocked counter-clockwise, as viewed in Fig. 13, or clockwise as in Fig. 15, pin 625 rocks bellcrank 475 counter-clockwise against the urgency of spring 480 to release the latch from its engagement with the ear 479.

It will be recalled that upon initiation of a multiplication operation proper, arm 495 (Fig. 15) was rocked counter-clockwise to engage clutch 500 for 270 degrees rotation of conditioning cam 374 and right shift control cam 575 when the clutch is immediately disengaged by ear 513. Upon release of the depressed control key when arm 495 is rocked clockwise, as viewed in Fig. 15, stud 515 thereon rocks bellcrank 510 to remove the ear 513 from its clutch-disengaging position, thereby effecting engagement of clutch 500 for 90 degrees rotation to its full-cycle position when the nose of cam 575 restores the right shift conditioning mechanism to its inoperative position. Similarly, cam 374 enables the release of the active setting arm 378 or 392 from engagement with respective pins 386 or 395 under the urgency of either spring 388 or 396. Following this 90 degree rotation of clutch 500, arm 495 is effective to disengage the clutch in the full-cycle position thereof.

The release of control keys 36, 37, or 38 also operates to enable the clockwise rocking of arm 415 and therefore shaft 156 (Figs. 15 and 17) under the urgency of spring 249 (Fig. 3) to release the latch 186 of the left shift and resetting control mechanism (Fig. 7) and to disengage the clutch and open the motor contacts.

Multiplier correction

The multiplier correction key 39 (Fig. 8) has a pin and slot connection with bellcrank 635 pivoted at 636 on frame plate 348. The depending arm of the bellcrank has pin 637 thereon which underlies the end of arm 470 and is operative to lift the notch therein out of engagement with the pin 469 of bellcrank 468 when the multiplier correction key is depressed. This prevents initiation of a multiplying operation at the conclusion of the left shift cycle at which time the shaft 459 is rocked clockwise as viewed in Fig. 8 or counter-clockwise as viewed in Fig. 15, as previously described. The pin 637 in lifting the rear end of the arm 470 brings it into engagement with pin 638 (Figs. 8 and 14) on arm 335 which, when rocked clockwise, it will be recalled, lifts the collar 334 and operating shift pawl 333 into operative engagement with the rack 332 of the multiplier pin carriage 256. When the key 39 is depressed and the bellcrank 635 is rocked counter-clockwise, the shaft 156 is rocked by reason of link 639 which interconnects the bellcrank and arm 640 secured to shaft 156. This rocking of shaft 156, as previously described, causes operation of the power-setting unit (Figs. 6 and 7) to initiate a left shift and resetting operation of the accumulator. However, it is undesirable to reset the values in the accumulator to "0" in the correction operation, so link 639 (Fig. 8) with pin 641, which engages arm 437 of resetting pusher link 209, rocks the nose 212 thereof out of operative engagement with the pusher rod 213. It will likewise be recalled that clockwise rocking of shaft 156 (Fig. 3) serves through arm 199 and slide 201 to engage the clutch and close the motor contacts. When the shaft 156 is rocked to initiate the operation, the main drive shaft 62 (Fig. 14) operates through bevel gear connection 179 to rotate shaft 178, which shaft rotation serves through shift pawl 333 to move the pin carriage to its rightmost position. Immediately upon reaching this position, shaft 178 (Figs. 9 and 14) through bevel gear connection 177 serves to impart a clockwise rotation to cam 618 (Fig. 9) which, it will be recalled, rocks sector 613 and therefore gear segment 296 to restore the adjusted rack segments 258 to their "0" position and through cam 608 to move pin restore plate 276 downwardly, moving the actively set pins to their inactive position and simultaneously releasing latch pawls 288 for holding pawls 284 to effect the latching of the rack segments 258 in their "0" positions.

Multiplier repeat mechanism

Means are provided for enabling the automatic re-entry of the previously set multiplier value into the multiplier pin carriage for subsequent control of a multiplication operation upon depression of a multiplication key. As pointed out supra, upon restoration of each active multiplier rack 258 to its "0" position during a multiplication operation and immediately following the disablement of feed pawl 318 for an ordinal right shifting movement of the pin carriage 256, the rack segment returns to it spreviously set position determined by the previously actively positioned pin 257 associated therewith. Consequently, following the return of the actively positioned highest order rack 258 to "0," and the subsequent right shift of the pin carriage, the multiplier factor previously set in the pin carriage is therefore re-entered therein since holding pawls 284 (Fig. 9) are disabled and latched during the selective setting of pins 257.

The subsequent idle shifting movement of the pin carriage serves to move sector 613 into cooperative relation with cam 618 to restore all set pins to their inactive position, to simultaneously release effective latch arms 288, and to return all rack segments 258 to their "0" position where they are held by holding pawls 284. Thus, it can be seen that if the right shifting movement of the pin carriage 256 is terminated immediately prior to the final or idle shift thereof, i. e., the last idle cycle is not rendered effective to restore all set pins 257 to their inactive position and to return the associated rack segments 258 to their latched position, and if the escapement mechanism is disabled to release pin carriage 256 for leftward movement to a predetermined position, each repositioned segment 258 again becomes operative to control a subsequent multiplication operation in a manner explained hereinbefore.

At the conclusion of a multiplying operation when clutch 500 is engaged for its last 90 degrees of rotation, roller 577 (Fig. 15) engages a cam surface on the lower end of a lever 578 to rock the lever counter-clockwise about its pivot 579. Lever 578 carries a link 645 pivotally connected thereto at 646. Link 645 is provided at its right, or forward, end with a hook 647 for operative engagement with a pin 648 on the free end of an arm 649 of a bellcrank 650 pivoted at 651 on frame plate 347. Pin 648 normally overlies the nose of the hook 647, which position of the pin is determined by the engagement of a horizontally extended arm 652 of bellcrank 650 with a stop 653 under the urgency of a spring 654. Link 645 carries a depending arm 655 having a pin 656 at the lower end thereof underlying a camming edge 657 at one end of an arm 658 of a bail 659 pivotally mounted on a pin 660 on frame plate 347. A second arm 661 of bail 659 extends upwardly and is bifurcated to engage a pin 662 on multiplier repeat control key 663 slidably mounted in brackets 664 (Figs. 13 and 15) secured to upper keyboard plate 260.

In the inoperative position of the key 663, as shown in Fig. 15, and with the initial rotation of clutch 500 and therefore roller 577, lever 578 is rocked clockwise under the urgency of spring 654 to move hook 647 to the right of pin 648, pin 656 being reciprocated along the cam surface 657. At the conclusion of a multiplication operation and in the last 90 degree rotation of clutch 500, roller 577 serves to rock lever 578 counter-clockwise for an idle rearward movement of the hook 647. If, however, control key 663 is moved forwardly to its operative position, bail 659 and therefore arm 658 are rocked clockwise (Fig. 15) thereby rocking cam face 657 away from pin 656 and enabling the forward end of link 645 to rise from the force of spring 654 as soon as it is free of pin 648. Then, when the clutch is engaged and roller 577 moves away from its blocking position shown and link 645 is moved forwardly by spring 654, hook 647 is permitted to rise so that it lies in front of pin 648, so that hook 647 will pull pin 648 rearwardly to rock bellcrank 650 in a counter-clockwise direction when link 645 is pulled rearwardly by the counter-clockwise rocking of lever 578 as clutch 500 returns to its full-cycle position. In terminating a multiplication operation with key 663 in its operative position, roller 577 rocks lever 578 (Fig. 15) to impart a counter-clockwise rotation to bellcrank 650 whereupon the forward end of arm 652 engages a laterally extended arm 665 of escapement stop pawl 304 (Fig. 12) to move the nose thereof out of engagement with the adjacent pin carriage rack tooth 271. Thus, the pin carriage 256 is released for unrestrained leftward movement to a predetermined active position wherein the nose of stop pawl 304 again becomes active to engage between the teeth 271 of the rack 269 upon initiation of a subsequent multiplying operation.

Means are provided under the control of repeat key 663 for terminating the leftward movement of the pin carriage in a predetermined position upon the disabling of stop pawl 304. For this purpose, key 663 carries a pin 670 (Fig. 13) engaged in a cam slot 671 in the free end of an arm 672 pivoted at 673 on a bracket mounted on upper keyboard plate 260. Arm 672 is provided with a protrusion 674 positioned thereon in operative relation to cam slot 671 and overlying an ear 675 formed at a right angle to the end of a horizontal arm of a bellcrank 676 pivotally mounted at 677 on an upright bracket secured on lower keyboard plate 261. The lower end of a depending arm 678 of bellcrank 676 is bifurcately engaged with a pin 679 at the upper end of one arm 680 of a three-armed lever 681 pivotally mounted for oscillatory movement on a stud 682 in side frame 347. A second arm 683 of three-armed lever 681 is angularly disposed to the left of arm 680 and carries a pin 684 overlying an arm 685 of a lever 686 pivotally mounted adjacent lever 681 on stud 682. Arm 685 is normally urged into engagement with pin 684 by a spring 687 secured at its one end to a stud on frame plate 347 and at its other end to a square stud 688 on an arm 689 of lever 686. A third arm 690 of three-armed lever 681 is angularly disposed to the right of arm 680 and carries a stud 691 supporting one end of a spring 692, the other end of which is secured to the stud on the frame, which spring serves to maintain ear 675 in operative engagement with protrusion 674 of arm 672. Arm 685 is provided with a tooth 693 for engagement in a selective notch between adjacent teeth 694 of an arcuate rack 695 formed at right angles to the end of an arm 696 pivotally mounted at 301 on the base of the machine (Fig. 19). A spring 697 normally urges a bent-over ear 698 on arm 696 into engagement with arm 350 of bellcrank 300 for rocking movement therewith, under the urgency of spring 303. In the rearward position (Figs. 13 and 15) of multiplier repeat key 663, tooth 693 is held out of engagement with the arcuate rack 695 under the urgency of spring 687. However, if a single multiplier factor is to be used for a plurality of multiplication operations, the factor is first set up in a conventional manner by the depression of keys 34 and with the entry of each digit of the factor, bellcrank 300 operates to escape the pin carriage one ordinal step to the left, as viewed from the front of the machine. With each stepped movement of the pin carriage, bellcrank 300 (Fig. 19) is rocked counter-clockwise under the urgency of spring 303 and therefore arm 696 is likewise rocked to position a notch of rack 695 into cooperative relation with the tooth 693 of arm 685. Thus it can be seen that the number of digits of the multiplier factor determines the notch for engagement by tooth 693, e. g., in using a factor of four digits, the pin carriage will escape four ordinal positions to the left and the fourth notch from the left in the rack 695 (Fig. 13) will be positioned immediately beneath tooth 693. Therefore, following the entry of the multiplier factor, key 663 is moved to the left, as viewed in Fig. 13, to cam arm 672 and bellcrank 676 in a clockwise direction, whereupon lever 681 serves through pin 684 to rock tooth 693 into engagement with the aligned notch of the rack 695. There is no notch provided in rack 695 representative of the initial, or home, position of the pin carriage 256 since it would serve no purpose whatever. Thus, if a multiplier factor has not been entered in the pin carriage to effect an escapement thereof, movement of multiplier repeat key 663 is prevented by the engagement of the tooth 693 with the top edge of rack 695.

Means are provided for positively maintaining tooth 693 in its notch-engaging position until a constant multiplier factor being utilized is no longer desired, as will be hereinafter described. Likewise, key 663 is resiliently maintained in its operative position by the upper end of slot 671 and the associated pin 670. The configuration of slot 671 is such that the upper end thereof forms a detent for pin 670 under the influence of spring 692 when arm 672 is rocked clockwise (Fig. 13) to its operative position thereby preventing return of key 663 to its inoperative position. Referring to Fig. 13, to latch tooth 693 in its active position a latch lever 704 is pivotally mounted on transverse shaft 459 and has the leading edge thereof resiliently urged by a spring 705 against one surface of square stud 688 of lever 686. As tooth 693 is moved into engagement with a selected notch of rack 695, square stud 688 moves counter-clockwise against the urgency of spring 687 and spring 705 serves to move a notch 706 in the upper end of latch lever 704 into engagement with stud 688. Since rack 695 and therefore arm 696 are positively held against movement, the ordinal return of the pin carriage to the right-hand, or "home," position during a multiplication operation serves through bellcrank 300 (Fig. 19) to tension spring 697. Consequently, during the last part of the last multiplication cycle following the release of multiplication control key 36, 37, or 38, stop pawl 304 (Fig. 12) is disabled and spring 303 moves the multiplier pin carriage unrestrainedly to the left until stopped by the engagement of arm 350 of bellcrank 300 with the ear 698 on arm 696.

It will be recalled that following the last step of movement of the pin carriage during a multiplying operation (the movement following the highest ordinal multiplication) each of the segments 258 will have been released to their previous multiplier factor setting, when a subsequent idle shifting movement is operative to simultaneously effect a restoration of all set pins to their inactive position and to return all rack segments to their "0" latched position. When it is desired that the previously set multiplier be used as a constant factor in a plurality of subsequent multiplying operations, the shifting movement of the multiplier pin carriage must be terminated in the next to the last step of movement thereof, thereby preventing operation of the clearing mechanism.

For this purpose an inverted L-shaped lever 707 is rockably mounted for sliding movement by the engagement of a bifurcation 708 in the rearward end thereof with transverse shaft 459. The vertically extended end of lever 707 lies adjacent arm 685 and arm 686 and is supported for reciprocatory movement by the engagement of an open end slot therein with pin 684 on arm 683 of lever 681. Near its vertex the upwardly extended arm of lever 707 is provided with a longitudinal slot engaging a pin 709 on the lower end of latching lever 343. Hence, a rearward movement of lever 707 imparts a counter-clockwise rotation to latching levers 343 and 345 (Figs. 8 and 13) thereby releasing a depressed control key 36, 37, 38 or 39, against the urgency of spring 349. Lever 707 is provided at its rearward end with a vertical extension 710 operatively related to an ear 711 on latching lever 704. Upon counter-clockwise rocking of latching lever 704 under the urgency of spring 705, when notch 706 engages beneath square stud 688 of lever 686, ear 711 abuts projection 710.

When rocked downwardly to its active position, the leading vertical edge of lever 707, which normally lies out of the plane of arm 350 and in a position to the left of the lower end of latching lever 343, is engaged by arm 350 of bellcrank 300 in the next to the last step of shifting movement of the pin carriage thereby releasing a depressed control key and releasing latch 704 from its engagement with square stud 688. However, with key 663 in its operative position for a repeat multiplying operation, notch 706 of latching lever 704 is immediately re-engaged with square stud 688 upon disabling of stop pawl 304 (Fig. 12) for movement of the pin carriage back to the left (its active position) under the influence of bellcrank 300 and spring 303.

In the manner described supra, at the conclusion of each multiplying operation, the multiplier racks 258 are automatically reset to the constant multiplier value and the pin carriage is tabulated to its predetermined active position. The operator then sets the next multiplicand in the keyboard and initiates the next multiplying operation by selective depression of either keys 36, 37 or 38.

The machine may be conditioned for nonrepeat multiplication at any time during the multiplying operation by the leftward movement of key 663, as viewed in Fig. 15, or the rightward movement thereof, as viewed in Fig. 13. Referring to Fig. 15, rearward movement of the key 663 from an operative position to that shown, operates through bail 659 and therefore arm 658 to rock lever 645 clockwise about its pivot 646 thereby disengaging the hook 647 from its engagement with pin 648. Thus, in the last part of the last multiplying cycle when clutch 500 is rotated its final 90 degrees, roller 577 rocks lever 578 to move link 645 rearwardly without effecting a release of stop pawl 304 (Fig. 12). Likewise, immediately upon return of key 663 to its inoperative position (Fig. 13) three-armed lever 681 is rocked clockwise under the urgency of its spring 692 to impart a counter-clockwise rotation to bellcrank 676. Clockwise rocking of lever 681 through pin 684 moves the forward end of lever 707 upwardly out of the plane of arm 350 thereby permitting the idle shifting movement of the pin carriage prior to the engagement of arm 350 of bellcrank 300 with the lower end of latch-releasing lever 343. However, movement of key 663 to its inoperative position during a multiplication operation is not effective to release the nose 693 from its engagement with a predetermined notch in rack 695 since latch 704 remains in its effective position with respect to lever 686 until the termination of the multiplying operation when latching lever 343 is rocked counter-clockwise to release the depressed control key and, through lever 707 and its projection 710, releases the latch 704 thereby enabling spring 687 to rock arm 685 upwardly into engagement with the pin 684. If key 663 is rendered inoperative at the conclusion of a multiplying operation, the subsequent multiplying operation becomes effective to release latch 704, thereby permitting rack 695 and therefore arm 696 to be rocked clockwise (Fig. 19) under the urgency of spring 697 when ear 698 engages arm 350 of bellcrank 300.

When three-armed lever 681, bellcrank 676, and arm 672 are returned to their normally inoperative positions by key 663 at the conclusion of a multiplying operation, multiplier correction key 39 may be depressed to restore the pin carriage to its right-hand position in a conventional manner when bellcrank 300, arm 350 and latching lever 343 operate to move link 707 to the right (Fig. 13) thereby releasing latch 704. However, means are provided to prevent the depression of the multiplier correction key 39 when key 663 is in its operative position. Since clutches 500 and 522 are not operated during a multiplier correction operation, lever 578 (Fig. 15) is not rocked to disable escapement stop pawl 304 for the release of the multiplier pin carriage. It will be recalled that upon return of the pin carriage to the right, when key 663 conditions the machine for repeat operation, there is no idle shifting movement thereof to effect restoration of all rack segments 258 to their "0" position and the escapement stop pawl 304 becomes effective to hold the pin carriage in the next to the last shifted position thereof.

Referring to Figs. 8 and 13, in order to prevent a depression of multiplier correction key 39 when the machine is conditioned for a multiplier repeat operation, an arm 715 of a bail 716 is rockably mounted on shaft 459 and maintained in engagement with stud 691 of three-armed lever 681 under the urgency of a spring 717. Bail 716 carries an arm 718 which is integral with arm 715 and having an aperture therein for securing one end of spring 717, the other of which is secured to a pin on arm 406. Arm 718 carries a pin 719 and is urged counter-clockwise by spring 717 to maintain arm 715 in engagement with stud 691 on lever 681. In the operative position of multiplier repeat key 663 and therefore lever 681, spring 717 serves to urge pin 719 to a position underlying the lower end of multiplier correction key 39 to prevent the depression thereof.

From the foregoing description it can be seen that the machine may be conditioned for nonrepeat multiplication by manually setting the key 663 to its inoperative position during a multiplying operation, or by inoperatively positioning key 663 at the conclusion of a multiplying operation when the termination of the succeeding multiplying operation becomes effective to disable the repeat mechanism. If this succeeding multiplication operation is not desired, the multiplier correction key 39 may be depressed, with the key 663 in its inoperative position, to return the pin carriage to its "home" position, to restore the pins 257 and return rack segments 258 to their "0" latched position, and to release latch 704 thereby releasing arm 696 to engage arm 350 of bellcrank 300.

We claim:

1. In a calculating machine having a register, differentially operative actuating means therefor, drive means for said actuating means, and means for controlling operation of said actuating means to perform a plural order multiplying operation, said last named means including a multiplier selection mechanism in which a multiplier factor is entered, ordinal elements differentially settable from a "0" position to represent the factor in said multiplier mechanism, holding means for maintaining said elements in the "0" position thereof, value entering means for disabling said holding means and setting said elements, latching means for retaining said holding means disabled, means operative by said drive means for incrementally returning the element in a preselected order to its "0" position during operation of said actuating means to control the ordinal series of operations in the preselected order, means normally operable by said drive means to restore said settable elements to "0" position and to disable said latching means upon termination of a multiplying operation, a control key, and means positionable by said control key to disable the operation of said restore means.

2. In a calculating machine having a product register, an actuating means therefor, a multiplier storage mechanism for receiving a multiplier factor, said mechanism having a plurality of ordinal positions including a normally ineffective position, an extreme position, and a series of operative positions for controlling the operation of said actuating means to perform a plural order multiplying operation, ordinal elements in said storage mechanism differentially settable from a "0" position to represent a multiplier factor, means for moving said storage mechanism from its ineffective position to an operative position during the setting of said elements, means for returning said storage mechanism through said ineffective position to said extreme position, zeroizing means operable in the extreme position of said storage mechanism to restore said elements to "0" position, and means controlled by said storage mechanism in the extreme position thereof for terminating a multiplying operation, a repeat multiplier mechanism including a control key, means positionable by said key for rendering said controlled means operative in the normally ineffective position of said storage mechanism, and means controlled by said key and operable upon termination of a multiplying operation for enabling said moving means to reposition said multiplier storage mechanism to the operative position thereof.

3. A calculating mchine comprising a product register, an actuating means therefor, cyclically operable means for driving said actuating means, registration control means for controlling operation of said actuating means, said last named means including a shiftable multiplier selection carriage having a plurality of positions, means for shifting said carriage in one direction from a normal intermediate position to a selected one of a series of active control positions, ordinal elements in said carriage differentially settable from a "0" position to represent a multiplier factor, means for controlling the operation of said shifting means during the setting of said ordinal elements, means for returning said carriage in the other direction from an active control position to an end position, means operable by said cyclically operable means for restoring said elements to "0" position upon return of said carriage to its end position, selectively operable means for terminating the operation of said returning means in the intermediate position of said carriage, and means controlled by said selectively operable means for operation by said cyclically operable means to effect operation of said shifting means upon return of said carriage to its intermediate position.

4. In a calculating machine having a product register, registration control means including a multiplicand representation means and a multiplier selection mechanism, said multiplier selection mechanism comprising a plurality of differentially adjustable ordinal elements in a shiftable carriage, means for normally latching said elements in a "0" position, means for releasing said latching means to effect differential adjustment of said adjustable elements and for actively positioning said carriage in accordance with a multiplier factor, means for initiating a multiplying operation, means cyclically operable during the multiplying operation for restoring said elements one by one to "0" position, and means for returning said carriage step-by-step to initial position, a mechanism for effecting re-entry of a multiplier factor into said selection mechanism comprising means for disabling the operation of said latching means upon operation of said releasing means, whereby upon operation of said initiating means said elements are restored to "0" during the multiplying operation and each element is immediately thereafter readjusted to its previously adjusted position.

5. In a calculating machine having a product register, registration control means including a multiplicand representation means and a multiplier selection mechanism, said multiplier selection mechanism comprising a plurality of differentially adjustable ordinal elements in an ordinally shiftable carriage, settable means for controlling the differential adjustment of said elements, means normally latching said elements in a "0" position, digital means for setting said settable means, releasing said latching means, and actively positioning said carriage ordinally in accordance with a multiplier factor, said registration control means including means cyclically operable during the multiplying operation for sequentially restoring said elements to "0" position and means for returning said carriage step-by-step to initial position, and means for initiating a multiplying operation, a repeat multiplier mechanism comprising a latch for said latching means, and means operable to enable said latch upon release of said latching means, thereby effecting return of said elements to their differentially adjusted positions as determined by the setting of said settable means following the restoration of said elements to "0" position.

6. In a calculating machine having a product register, registration control means including a multiplicand representation means and a multiplier selection mechanism, said multiplier selection mechanism comprising an ordinally shiftable carriage having a plurality of positions, a plurality of normally zeroized spring-urged ordinal elements in said carriage adjustable to represent the digits of a multiplier factor, latching means for said elements in the "0" position thereof, means for shifting said carriage in one direction from an intermediate position to one of a series of active positions in accordance with a multiplier factor, digital means operable to release said latching means, to adjust said elements, and to enable said shifting means, means for initating a multiplying operation, said registration control means including means operated cyclically during a multiplying operation for restoring said elements to "0" and thereafter releasing said elements to the previously adjusted position means for returning said carriage in the other direction to an end position, driving means for said returning means, means controlled by said driving means for restoring said elements to "0" and enabling said latching means in said end position of said carriage, and means operable by said returning means to terminate a multiplying operation upon return of said carriage to said end position, a mechanism for conditioning said multiplier selection mechanism for re-entry of a multiplier factor comprising a key, and means associated with said terminating means and positionable by said key to effect a termination of a multiplying operation by said returning means upon return of said carriage to the intermediate position thereof.

7. In a calculating machine having a product register, registration control means including a multiplicand representation means and a multiplier selection mechanism, said multiplier selection mechanism comprising a shiftable carriage having a plurality of positions, a plurality of ordinal spring-urged elements in said carriage, means normally latching said elements in a "0" position, means settable to differentially adjust said elements one by one in accordance with each digit of a multiplier factor, means for shifting said carriage in one direction from an intermediate position to an active position, an escapement mechanism for controlling a one step ordinal operation of said shifting means for each multiplier digit, a multiplier factor entering means operable to set said settable means, release said latching means, and effect operation of said escapement mechanism, said registration control means including means for initiating a multiplying operation, means cyclically operated during a multiplying operation for ordinally restoring said elements to "0" position and thereafter releasing said elements, cyclic drive means for said cyclically operated means, means controlled by said drive means for returning said carriage step-by-step in an opposite direction to an end position upon ordinal restoration of said elements to "0," a repeat multiplier mechanism comprising the combination of a control key settable from an inoperative to an operative position, a latch member for maintaining said latching means inoperative upon release thereof, thereby effecting readjustment of each element to its previously adjusted position upon restoration thereof to "0," resetting means operable to restore said settable means to their inactive position and to release said latch member and enable said latching means, zeroizing means normally operable by said drive means to control operation of said resetting means and to restore said elements to "0" latched position in said end position of said carriage, means operable by said returning means for terminating a multiplying operation in said end position of said carriage, and means positionable by said key in the operative position thereof for rendering said terminating means operable in the intermediate position of said carriage, whereby said zeroizing means is ineffective to reset said settable means and to zeroize said elements.

8. In the apparatus of claim 7 having means for disabling said escapement mechanism to permit unrestrained movement of said carriage by said shifting means in the one direction toward the active position occupied thereby upon setting of the multiplier factor therein, means operated by said key when moved to operative position for enabling operation of said disabling means, and means driven by said cyclic drive means and rendered operable by said terminating means to actuate said key-operated means.

9. The apparatus of claim 8 having a rack associated with said shifting means, resilient means normally maintaining said rack in engagement with said shifting means for movement therewith, means movable by said key for engagement with said rack to lock said rack against movement after said rack and said carriage have been positioned in accordance with the multiplier factor and before operation of said initiating means, said rack being operable upon operation of said disabling means to reposition said carriage in accordance with the multiplier factor to be repeated, and a holding means for retaining said locking means in engagement with said rack upon setting said key in the inoperative position thereof and adapted for release by said terminating means in said end position of said carriage.

References Cited in the file of this patent

UNITED STATES PATENTS

| | | |
|---|---|---|
| 2,320,025 | Avery | May 25, 1943 |
| 2,376,997 | Friden et al. | May 29, 1945 |
| 2,531,205 | Gang | Nov. 21, 1950 |